(12) United States Patent
Guo

(10) Patent No.: US 12,115,667 B2
(45) Date of Patent: Oct. 15, 2024

(54) DEVICE AND METHOD FOR CONTROLLING A ROBOTIC DEVICE

(71) Applicant: Robert Bosch GmbH, Stuttgart (DE)

(72) Inventor: Meng Guo, Renningen (DE)

( * ) Notice: Subject to any disclaimer, the term of this patent is extended or adjusted under 35 U.S.C. 154(b) by 417 days.

(21) Appl. No.: 17/455,122

(22) Filed: Nov. 16, 2021

(65) Prior Publication Data

US 2022/0161424 A1    May 26, 2022

(30) Foreign Application Priority Data

Nov. 20, 2020 (DE) ...................... 10 2020 214 633.0

(51) Int. Cl.
*B25J 9/16*      (2006.01)
*G06T 7/50*      (2017.01)

(52) U.S. Cl.
CPC .............. *B25J 9/163* (2013.01); *B25J 9/1653* (2013.01); *B25J 9/1664* (2013.01); *B25J 9/1697* (2013.01); *G06T 7/50* (2017.01); *G06T 2207/20081* (2013.01)

(58) Field of Classification Search
CPC ........ B25J 9/163; B25J 9/1653; B25J 9/1664; B25J 9/1697; B25J 13/00; B25J 9/16; B25J 9/1602; B25J 9/161; B25J 13/08; G06T 7/50; G06T 2207/20081; G05B 2219/39298; G05B 2219/40116; G05B 2219/40499; G05B 2219/40514; G05B 2219/40607

See application file for complete search history.

(56) References Cited

U.S. PATENT DOCUMENTS

| | | | |
|---|---|---|---|
| 2019/0261565 A1* | 8/2019 | Robertson | A01D 46/22 |
| 2020/0215686 A1* | 7/2020 | Vijayanarasimhan | ... B25J 9/163 |
| 2020/0316779 A1* | 10/2020 | Truebenbach | B25J 9/1692 |
| 2021/0154832 A1* | 5/2021 | Truebenbach | B25J 17/0241 |
| 2021/0237266 A1* | 8/2021 | Kalashnikov | B25J 9/1602 |
| 2021/0276187 A1* | 9/2021 | Tang | G06N 3/08 |

OTHER PUBLICATIONS

Kyrarini, M., Haseeb, M.A., Ristić-Durrant, D. et al. Robot learning of industrial assembly task via human demonstrations. Auton Robot 43, 239-257 (2019). https://doi.org/10.1007/s10514-018-9725-6 (Year: 2019).*
L. Schwenkel, M. Guo, und M. Bürger, "Optimizing sequences of probabilistic manipulation skills learned from demonstration", in Conference on Robot Learning, 2019. Retrieved from the Internet on Nov. 16, 2021: http://proceedings.mlr.press/v100/schwenkel20a.html. 10 Pages.
M. Zeestraten, "Programming by demonstrations on Riemannian manifolds" 2017, Dissertation.
J Mahler et al., "Learning ambidextrous robot grasping policies" in Science Robotics, 2019.

* cited by examiner

*Primary Examiner* — Jason Holloway
(74) *Attorney, Agent, or Firm* — NORTON ROSE FULBRIGHT US LLP; Gerard A. Messina

(57) ABSTRACT

A device and a method for controlling a robotic device, including a control model. The control model includes a robot trajectory model, which for the pickup includes a hidden semi-Markov model with one or multiple initial states, a precondition model, which for each initial state of the robot trajectory model includes a probability distribution of robot configurations before the pickup is carried out, and an object pickup model, which for a depth image outputs a plurality of pickup robot configurations having a respective associated probability of success.

14 Claims, 11 Drawing Sheets

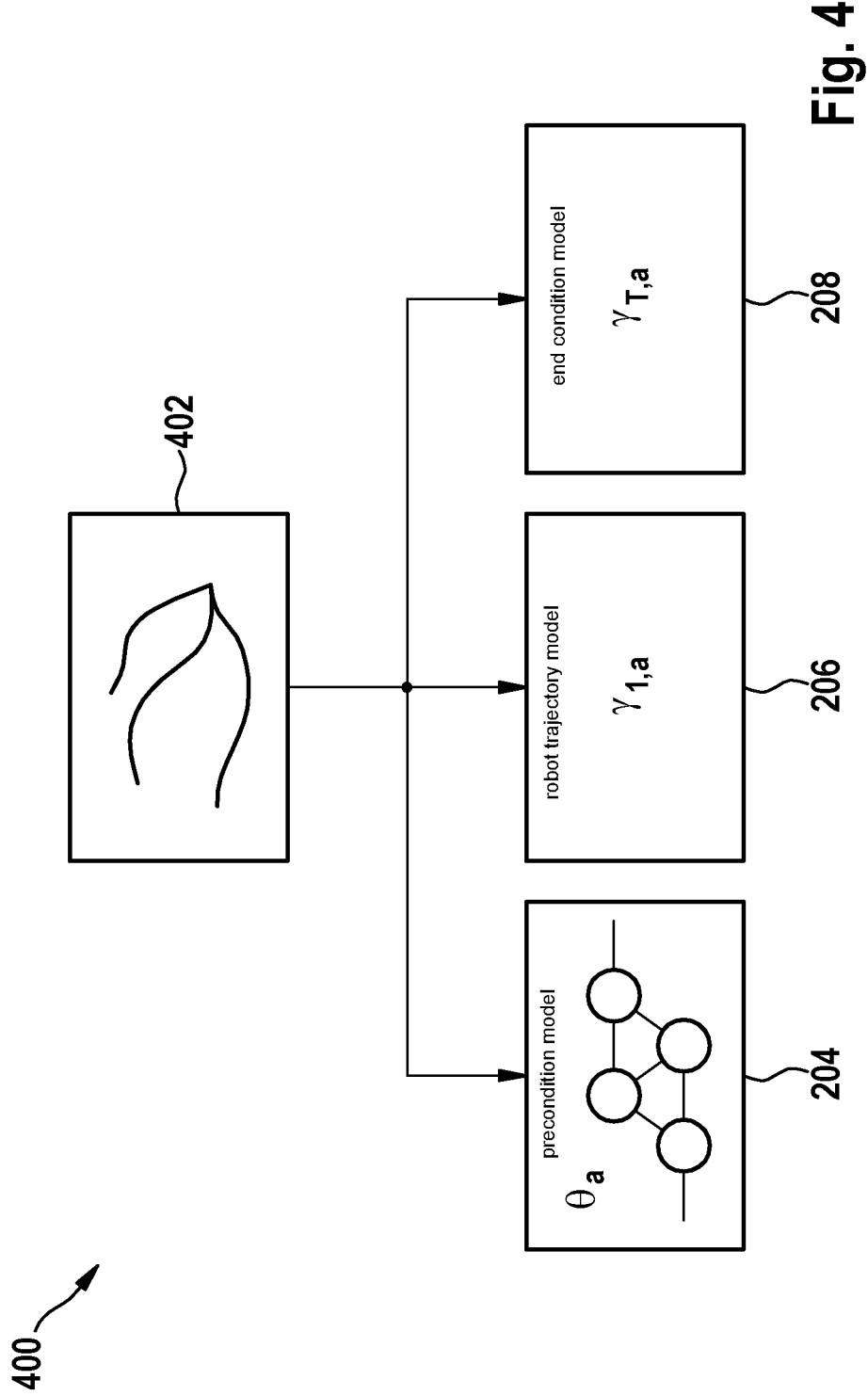

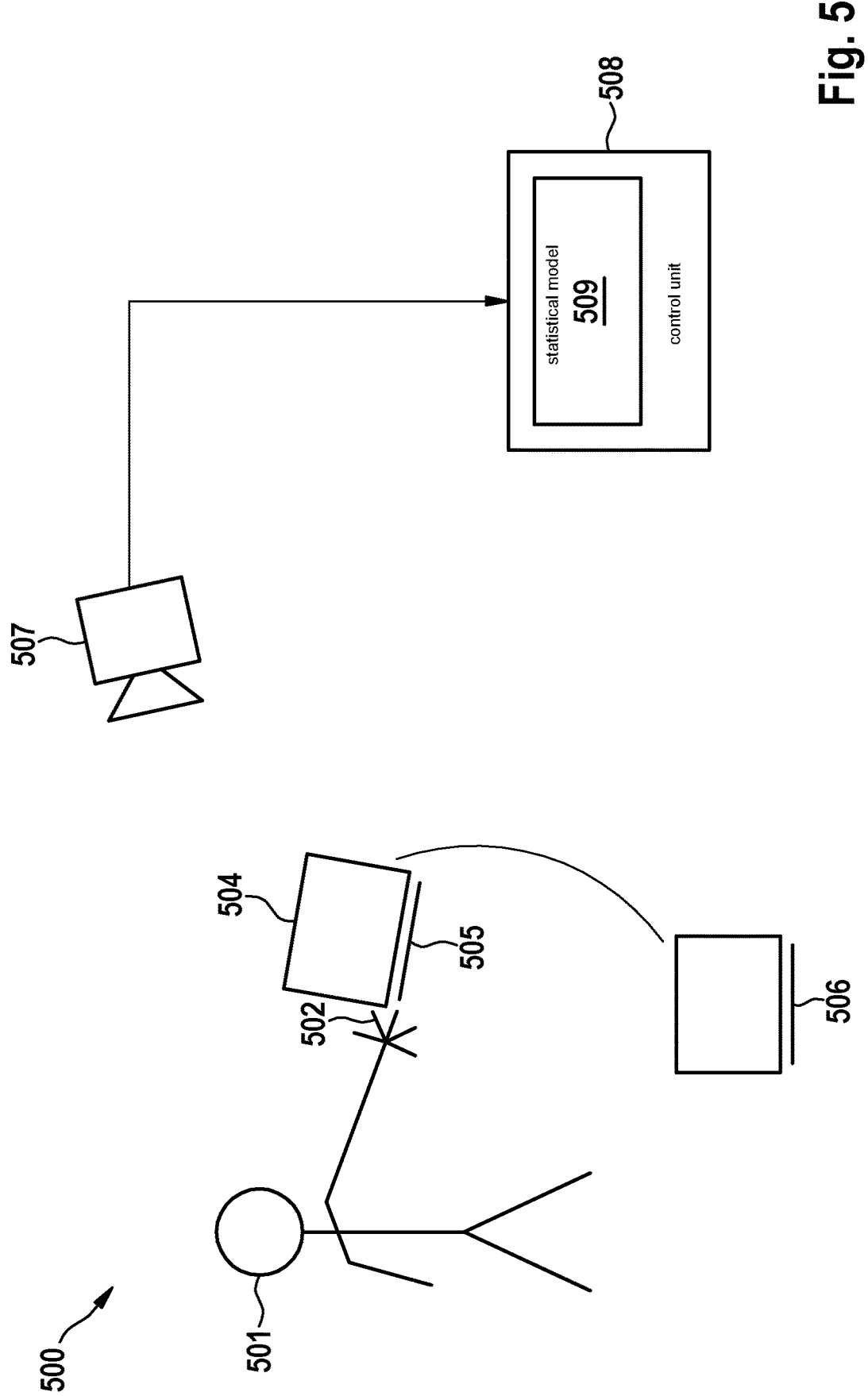

DEVICE AND METHOD FOR CONTROLLING A ROBOTIC DEVICE

FIELD

Various exemplary embodiments relate in general to a device and a method for controlling a robotic device.

BACKGROUND INFORMATION

Robotic devices may be used, for example, in manufacturing, in production, in maintenance, in the household, in medical technology, etc. The robotic devices may, for example, pick up and move objects. A robot control model may ascertain how the robotic device picks up and moves an object (using one or multiple robot arms, for example). However, this may be a function of other objects that are in the vicinity of the object to be picked up, and of geometric configurations of the robotic device. For example, an object may obstruct a trajectory of a robot arm. It may therefore be necessary for a robot control model to ascertain control commands for an object to be picked up (and optionally also to be moved) in such a way that other objects as well as geometric conditions of the robotic device are taken into account.

The reference "Learning ambidextrous robot grasping policies" by J. Mahler et al. in Science Robotics, 2019 (referred to below as reference [1]) describes a model (Dexterity Network (Dex-Net)) that ascertains a gripping configuration of a robot arm, based on a depth image showing multiple objects, in order to grip an object of the multiple objects.

The dissertation "Programming by demonstrations on Riemannian manifolds" by M. Zeestraten, 2017 (referred to below as reference [2]) describes an ascertainment of task parameters for a robot pose.

In addition, it may be advantageous to impart robot capabilities to the robot control model based on demonstrations.

The reference "Optimizing sequences of probabilistic manipulation skills learned from demonstration" by L. Schwenkel, M. Guo, and M. Bürger in Conference on Robot Learning, 2019 (referred to below as [3]) describes a skill-centered approach in which each skill is independently learned under various scenarios.

The method and the device having the features of an example embodiment of the present invention (first example) and another example embodiment of the present invention (fifteenth example), respectively, allow robot configurations and a robot trajectory for an object to be picked up to be ascertained in such a way that dynamic conditions (for example, other objects as well as geometric conditions) of the robotic device are taken into account. For example, a robot control model may be adapted (individualized, for example) to geometric and other conditions of a robotic device. In particular, the method and the device may provide for a robot configuration to be executed in conjunction with a robot trajectory to be implemented, using a trained control model. In addition, a method and a device are provided, with the aid of which robot capabilities may be imparted to the control model based on demonstrations.

A robotic device may be any type of computer-controlled device, such as a robot (for example, a manufacturing robot, a maintenance robot, a household robot, a medical robot, etc.), a vehicle (an autonomous vehicle, for example), a household appliance, a production machine, a personal assistant, an access control system, etc.

The control model generated according to the first example takes into account, for example, the relationships of an object to be moved with respect to other objects on the one hand, and on the other hand, the geometric conditions on which a movement of the robotic device (of a robot arm for example) is based. As described, the mobility of the robotic device is taken into account in this way. As described, dynamic conditions of the robotic device are taken into account in this way.

The robot trajectory model and the precondition model may be trained to carry out the pickup of an object, using demonstrations. The feature described in this paragraph in combination with the first example forms a second example.

With the aid of the robot trajectory model, learned from demonstrations, and the precondition model, a robot trajectory may be ascertained with low computing complexity.

The object pickup model may be trained using a plurality of training depth images, it being possible for each training depth image to show at least one object of a plurality of objects. The training may include: for each training depth image of the plurality of training depth images, simulating a repeated pickup of the at least one object, and ascertaining, as a reward, whether or not the particular pickup of the at least one object is successful, each pickup of the at least one object being associated with a particular pickup robot configuration; and training the object pickup model using the plurality of training depth images, the rewards, and the pickup robot configurations, in such a way that the trained object pickup model, in response to an input of a depth image, outputs a plurality of pickup robot configurations having a respective associated probability of success. The features described in this paragraph in combination with the first example or the second example form a third example.

As described, a preselection of pickup robot configurations having a high expected probability of success may be ascertained in this way with the aid of the trained object pickup model.

The ascertainment, as a reward, of whether or not a pickup is successful may include: ascertaining a predefined maximum reward if the pickup is successful; and ascertaining a predefined minimum reward if the pickup is not successful. The features described in this paragraph in combination with the third example form a fourth example.

Each pickup of an object may be simulated using the robot trajectory model and the precondition model. The features described in this paragraph in combination with the third example or the fourth example form a fifth example.

In this way, the dynamic conditions of the robotic device (for example, relationships of objects in a work area of the robotic device, geometric conditions of a robot arm of the robotic device, etc.) may be taken into account during the training of the object pickup model, as the result of which the accuracy of the probabilities of success that are output with the aid of the trained object pickup model may be improved.

The method may also include: ascertaining whether or not the carrying out of the pickup of the object by the robotic device is successful, a predefined maximum reward being ascertained if the carrying out of the pickup is successful, and a predefined minimum reward being ascertained if the carrying out of the pickup is not successful; and additionally training the object pickup model using the ascertained depth image, the pickup robot configuration for which the robot trajectory is ascertained, and the ascertained reward. The features described in this paragraph in combination with one or multiple of the first through the fifth examples form a sixth example.

In this way, the object pickup model, for example during operation of the robotic device, may be additionally adapted to other or new circumstances (for example, other or new objects, for example geometric conditions based on other or additional robot arms).

The control model may also be configured to control the robotic device for moving a picked-up object. For the movement, the robot trajectory model may include a hidden semi-Markov model with one or multiple initial states and one or multiple end states. For each initial state of the robot trajectory model associated with the movement, the precondition model may include a probability distribution of robot configurations before the movement is carried out. In addition, the control model may include an end condition model, for each end state of the robot trajectory model associated with the pickup, the end condition model including a probability distribution of robot configurations after carrying out the pickup, and for each end state of the robot trajectory model associated with the movement, including a probability distribution of robot configurations after carrying out the movement. The method may also include: ascertaining a robot configuration after carrying out the pickup of the object according to the end condition model; ascertaining a robot trajectory for moving the object with the aid of the robot trajectory model; and controlling the robotic device for carrying out the movement of the object with the aid of the ascertained robot trajectory. The features described in this paragraph in combination with one or multiple of the first through sixth examples form a seventh example.

In this way, the subsequent movement (for example, a movement into a target configuration and/or target position) may be taken into account when selecting the pickup robot configuration. For example, the geometric conditions and/or other objects in the work area of the robotic device, during pickup of the object as well as during movement of the object, may thus be taken into account for selecting the pickup robot configuration.

The robot trajectory model, the precondition model, and the end condition model may be trained, using demonstrations for carrying out the pickup of an object and demonstrations for carrying out the movement of an object. The features described in this paragraph in combination with the seventh example form an eighth example.

A robot trajectory may be ascertained with low computing complexity with the aid of the robot trajectory model learned from demonstrations, the precondition model, and the end condition model.

The object pickup model may be trained using a plurality of training depth images, it being possible for each training depth image to show at least one object of a plurality of objects. The training may include: for each training depth image of the plurality of training depth images, simulating a repeated pickup and subsequent movement of the at least one object, and ascertaining, as a reward, whether or not the particular pickup and subsequent movement of the at least one object is successful, each pickup of the at least one object being associated with a particular pickup robot configuration; and training the object pickup model, using the plurality of training depth images, the rewards, and the pickup robot configurations in such a way that the trained object pickup model, in response to an input of a depth image, outputs a plurality of pickup robot configurations having a respective associated probability of success. The features described in this paragraph in combination with the seventh example or the eighth example form a ninth example.

As described, in this way it is possible to take into account not only the pickup of an object, but also the subsequent movement of the picked-up object when ascertaining the plurality of pickup robot configurations having the associated probabilities of success. As described, a success of the subsequent movement (for example, a movement to a destination point) is thus also taken into account in the probability of success. The accuracy of the ascertained probability of success may thus be significantly increased.

The ascertainment, as a reward, of whether or not a pickup and subsequent movement are successful may include: ascertaining a predefined maximum reward if the pickup and subsequent movement are successful; and ascertaining a predefined minimum reward if the pickup and subsequent movement are not successful. The features described in this paragraph in combination with the ninth example form a tenth example.

Each pickup and subsequent movement of an object may be simulated using the robot trajectory model, the precondition model, and the end condition model. The features described in this paragraph in combination with the ninth example or the tenth example form an eleventh example.

In this way, dynamic conditions of the robotic device (of a robot arm, for example) may be taken into account by the trained object pickup model when ascertaining pickup robot configurations, so that the accuracy of a probability of success that is ascertained with the aid of the object pickup model is improved (increased, for example).

The method may also include: ascertaining whether or not the carrying out of the movement of the object by the robotic device is successful, a predefined maximum reward being ascertained if the carrying out of the movement is successful, and a predefined minimum reward being ascertained if the carrying out of the movement is not successful; and additionally training the object pickup model using the ascertained depth image, the pickup robot configuration for which the robot trajectory for picking up the object is ascertained, and the ascertained reward. The features described in this paragraph in combination with one or multiple of the seventh through the tenth examples form a twelfth example.

The robotic device may include a first robot arm for picking up an object and a second robot arm for picking up an object. The control model may include a robot trajectory model, a precondition model, and an object pickup model in each case for the first robot arm and the second robot arm. The ascertainment of one or multiple pickup robot configurations having a probability of success above a predefined threshold value with the aid of the object pickup model for at least one object to be moved of the one or multiple objects, using the depth image, may include: for at least one object to be moved of the one or multiple objects, ascertaining one or multiple pickup robot configurations of the first robot arm having a probability of success above a predefined threshold value with the aid of the object pickup model associated with the first robot arm, using the depth image, and ascertaining one or multiple pickup robot configurations of the second robot arm having a probability of success above a predefined threshold value with the aid of the object pickup model associated with the second robot arm, using the depth image. The ascertainment of the robot trajectory for the pickup with the aid of the robot trajectory model for the pickup robot configuration of the one or multiple pickup robot configurations having the highest probability according to the precondition model may include: selecting the pickup robot configuration from the one or multiple pickup robot configurations of the first robot arm and the one or multiple pickup robot configurations of the second robot arm having the highest probability according to the respective associated precondition model, and selecting the robot arm associated with the selected pickup robot configuration, and ascertaining a robot trajectory for the pickup according to the selected pickup robot configuration with the aid of the robot trajectory model associated with the selected robot arm. The control of the robotic device for carrying out the pickup of the object with the aid of the ascertained robot trajectory may include: controlling the selected robot arm of the robotic device for carrying out the pickup of the object with the aid of the ascertained robot trajectory. The features described in this paragraph in combination with one or multiple of the first through the twelfth examples form a thirteenth example.

In this way, the dynamic conditions (geometric conditions, for example) of both robot arms as well as the objects in the work area of the two robot arms may be taken into account when selecting a pickup robot configuration. As described, the selection of an object to be picked up may thus be improved in such a way that a probability for a successful carrying out of the pickup for the selected object with the aid of the associated pickup robot configuration is increased.

The pickup of an object with the aid of the first robot arm may include suctioning the object, and/or the pickup of an object with the aid of the second robot arm may include gripping the object. The features described in this paragraph in combination with the thirteenth example form a fourteenth example.

A computer program product may store program instructions which, when executed, carry out the method according to one or multiple of the first through the fourteenth examples. The computer program product having the features described in this paragraph forms a sixteenth example.

A nonvolatile memory medium may store program instructions which, when executed, carry out the method according to one or multiple of the first through the fourteenth examples. The nonvolatile memory medium having the features described in this paragraph forms a seventeenth example.

A nonvolatile memory medium may store program instructions which, when executed, carry out the method according to one or multiple of the first through the fourteenth examples. The nonvolatile memory medium having the features described in this paragraph forms an eighteenth example.

A computer program may include instructions which, when executed by a processor, cause the processor to carry out a method according to one or multiple of the first through the fourteenth examples. The computer program having the features described in this paragraph forms a nineteenth example.

A computer-readable medium may store instructions which, when executed by a processor, cause the processor to carry out a method according to one or multiple of the first through the fourteenth examples. The computer-readable medium having the features described in this paragraph forms a twentieth example.

Exemplary embodiments of the present invention are illustrated in the figures and explained in greater detail in the following description.

BRIEF DESCRIPTION OF THE DRAWINGS

FIG. 4 shows a flowchart of learning from demonstrations according to various specific embodiments of the present invention.

FIG. 5 shows an arrangement for recording demonstrations of a user according to various specific embodiments of the present invention

DETAILED DESCRIPTION OF EXAMPLE EMBODIMENTS

In one specific embodiment, a "computer" may be understood as any type of logic-implementing entity, which may be hardware, software, firmware, or a combination thereof. Therefore, in one specific embodiment a computer may be a hard-wired logic circuit or a programmable logic circuit, such as a programmable processor, for example a microprocessor (for example, a CISC (processor including a large instruction set) or a RISC (processor including a reduced instruction set)). A computer may include one or multiple processors. A computer may also be software that is implemented or executed by a processor, for example any type of computer program, for example a computer program that uses a virtual machine code such as Java. In accordance with one alternative specific embodiment, any other type of implementation of the particular functions, described in greater detail below, may be understood as a computer.

For controlling robotic devices for picking up and moving objects, robot control models may be used to ascertain configurations and trajectories of the robotic device. Other objects and geometric conditions of the robotic device may limit the configurations and/or trajectory of the robotic device. Various exemplary embodiments relate to a device and a method for controlling a robotic device, which are able to control a pickup and movement of objects with the aid of the robotic device in such a way that other objects as well as geometric conditions of the robotic device are taken into account. As described, a failure rate of the pickup and movement of objects by the robotic device may thus be significantly reduced.

Figure 1:
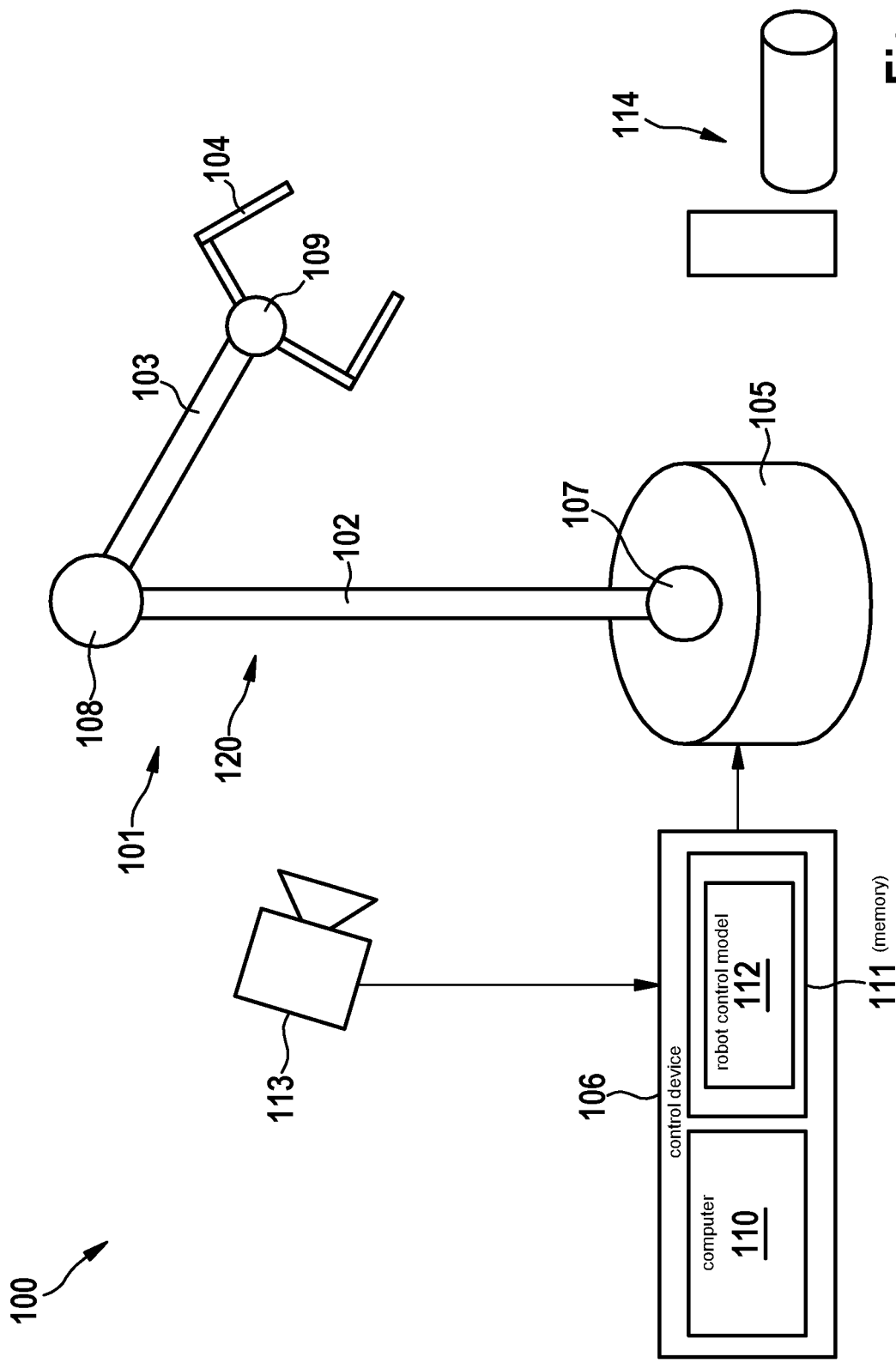
FIG. 1 shows an example of a robotic device system according to various specific embodiments of the present invention.

FIG. 1 shows a robotic device system 100. Robotic device system 100 may include a robotic device 101. Robotic device 101 shown in FIG. 1 and described by way of example below represents an example of a robotic device for the purpose of illustration, and, may include, for example, an industrial robot in the form of a robot arm for moving, mounting, or machining a workpiece. It is pointed out that the robotic device may be any type of computer-controlled device, such as a robot (for example, a manufacturing robot, a maintenance robot, a household robot, a medical robot, etc.), a vehicle (an autonomous vehicle, for example), a household appliance, a production machine, a personal assistant, an access control system, etc.

Robotic device 101 includes robot members 102, 103, 104 and a base (or in general a mounting) 105 via which robot members 102, 103, 104 are supported. The term "robot member" refers to the movable parts of robotic device 101, whose actuation allows a physical interaction with the surroundings, for example to perform a task, for example to execute or perform one or multiple skills.

For control, robotic device system 100 includes a control device 106 that is configured to achieve the interaction with the surroundings according to a control program. Last element 104 (viewed from base 105) of robot members 102, 103, 104 is also referred to as an end effector 104, and may include one or multiple tools such as a gripping tool or a suction device (a suction head, for example) or the like.

The other robot members 102, 103 (closer to base 105) may form a positioning device, so that together with end effector 104, a robot arm 120 (or articulated arm) with end effector 104 at its end is provided. Robot arm 120 is a mechanical arm that may fulfill functions similarly to a human arm (possibly including a tool at its end).

Robotic device 101 may include connecting elements 107, 108, 109 that connect robot members 102, 103, 104 to one another and to base 105. A connecting element 107, 108, 109 may include one or multiple articulated joints, each of which may provide a rotational movement and/or a translational movement (i.e., a displacement) for associated robot members relative to one another. The movement of robot members 102, 103, 104 may be initiated with the aid of actuators that are controlled by control device 106.

The term "actuator" may be understood as a component that is suitable for influencing a mechanism as a response to the actuator being driven. The actuator may convert instructions (so-called activation), output by control device 106, into mechanical movements. The actuator, for example an electromechanical converter, may be configured to convert electrical energy into mechanical energy as a response to the actuator being activated.

The term "control device" (also referred to as "control unit") may be understood as any type of logical implementation unit, which may include a circuit and/or a processor, for example, that is able to execute software, firmware, or a combination of same stored in a memory medium, and that may issue instructions, for example to an actuator in the present example. The control device may be configured to control the operation of a system, in the present example a robot, using program code (software, for example).

In the present example, control device 106 includes a computer 110, and a memory 111 that stores code and data on the basis of which computer 110 controls robotic device 101. According to various specific embodiments, control device 106 controls robotic device 101 based on a robot control model 112 stored in memory 111.

According to various specific embodiments, robotic device 101 (robot arm 120, for example) may be configured to pick up one or multiple objects 114. According to various specific embodiments, robotic device 101 (robot arm 120, for example) may be configured to move a picked-up object.

According to various specific embodiments, robotic device system 100 may include one or multiple sensors. The one or multiple sensors may be configured to provide sensor data that characterize a state of the robotic device. For example, the one or multiple sensors may include an imaging sensor such as a camera (for example, a standard camera, a digital camera, an infrared camera, a stereo camera, etc.), a radar sensor, a LIDAR sensor, a position sensor, a speed sensor, an ultrasonic sensor, an acceleration sensor, a pressure sensor, etc.

Robotic device 101 may be in a state of a plurality of states. According to various specific embodiments, at any point in time robotic device 101 may be in a present state of the plurality of states. The particular state of the plurality of states may be ascertained using the sensor data provided by the one or multiple sensors and/or the configuration of robotic device 101.

According to various specific embodiments, the one or multiple sensors may include at least one depth camera. Depth camera 113 may be configured, for example, to provide depth images (RGB-D images, for example) that show the one or multiple objects 114.

Robotic device 101 may be configured to execute a plurality of skills. The skills of the plurality of skills may be predefined, for example, in the program code of control device 106. One or multiple skills of the plurality of skills may include, for example, a mechanical movement of one or multiple robot members 102, 103, 104. One or multiple skills of the plurality of skills may include, for example, an action of the end effector (for example, gripping or releasing, etc.). According to various specific embodiments, a skill that is executed in a present state of robotic device 101 may lead to a resulting state of the plurality of states of robotic device 101.

Robot control model 112 may be configured to ascertain, for a depth image that shows the one or multiple objects 114, a robot configuration and a robot trajectory for picking up (and optionally also for moving) an object of the one or multiple objects 114. Control device 106 may be configured to control robotic device 101, using robot control model 112, for carrying out the pickup of the object with the aid of the ascertained robot trajectory.

"Picking up an object" as used herein may mean contacting the object in such a way that the object may be moved due to a movement of robotic device 101 (of robot arm 120, for example). The pickup may be a function of the type of end effector 104. For example, end effector 104 may include a gripping tool, and the pickup of an object may involve gripping the object. For example, end effector 104 may include a suction device (a suction head, for example), and the pickup of an object may involve suctioning the object.

According to various specific embodiments, robot control model 112 may be generated (for example learned or trained) while robotic device 101 is out of operation. According to various specific embodiments, generated robot control model 112 may be used during operation of robotic device 101 in order to ascertain skills that are to be executed by robotic device 101. According to various specific embodiments, generated robot control model 112 may be additionally trained during operation of robotic device 101.

Figure 2:
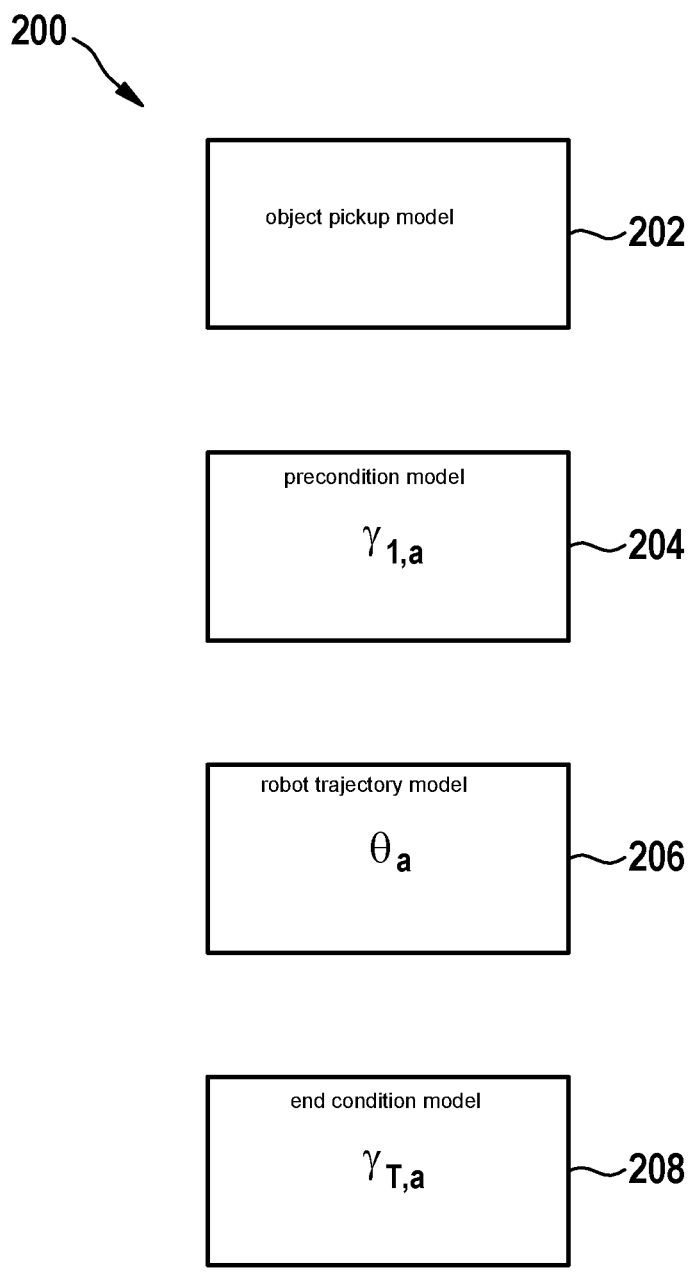
FIG. 2 shows a control model according to various specific embodiments of the present invention.

FIG. 2 shows a control model 200 according to various specific embodiments. Control model 200 may be used, for example, as a robot control model 112 and/or as part of control model 112.

Control device 106 may be configured to control a robotic device for executing a skill. For the purpose of illustration, in the discussion below the control of robotic device 101 is described for executing a pickup skill, for example for picking up an object. It is pointed out that other robotic devices may be used, and that other skills, for example a movement of picked-up objects, may be executed.

According to various specific embodiments, control model 200 may include an object pickup model 202. Object pickup model 202, in response to an input of a depth image, may be configured to output a plurality of pickup robot configurations having a respective associated probability of success. According to various specific embodiments, object pickup model 202, in response to an input of a depth image, may be configured to output one or multiple pickup robot configurations having a probability of success above a predefined threshold value (i.e., having a probability of success greater than the predefined threshold value).

A probability that is used herein has an associated probability value. When a probability is compared herein to another probability or to a threshold value (for example, greater than, less than, higher, lower, above), this refers to the probability value associated with the probability.

A robot configuration as used herein may be a robot pose (for example, an end effector pose). A robot configuration may include an end effector rotation (for example, an end effector orientation), for example. A robot configuration may include an end effector position (for example, an end effector translation), for example. End effector position t may be a 3D position $t \in \mathbb{R}^3$. As described, a robot configuration may be a 6D configuration of the end effector, which encompasses the 3D position and the orientation (orientation in 3D space, for example). The pickup robot configuration may be the robot configuration that is ascertained for the pickup of an associated object.

A probability of success associated with a pickup robot configuration may indicate with what probability a successful execution of the pickup skill is expected. A successful execution of the pickup skill may be, for example, that the end effector may grip, lift, and/or move the object associated with the robot configuration. This may analogously apply for other skills (for example, a movement skill of robot arm 120). The ascertainment of a probability of success for a pickup robot configuration may be, for example, a classification (of the class "successful," for example) of the pickup robot configuration.

A training of an object pickup model 202 is described with reference to FIG. 6, for example.

According to various specific embodiments, control model 200 may include a robot trajectory model 206. Robot trajectory model 206 may include for an associated skill (for example, a pickup or a movement) a hidden semi-Markov model with one or multiple initial states and one or multiple end states. As described, robot trajectory model 206 may ascertain a robot trajectory, using task parameters.

Robot trajectory model 206 may be a TP-HSMM. A hidden semi-Markov model (HSMM) expands a simple hidden Markov model (HMM) in such a way that pieces of temporal information are embedded in the underlying stochastic process. This means that, while it is assumed for an HMM that the underlying statistical process has the Markov property, i.e., the probability of transitioning into the next state is a function only of the instantaneous state, for an HSMM process the probability of transitioning into the next state is a function of the instantaneous state and of the residence time in the instantaneous state. HSMMs are typically used in particular in speech synthesis.

A task-parameterized HSMM (TP-HSMM), such as robot trajectory model 206, according to various specific embodiments for a skill is represented by $$\theta = \{\{a_{hk}\}_{h=1}^{K}, (\mu_k^D, \sigma_k^D), \gamma_k\}_{k=1}^{K}, \quad (1)$$

where $\alpha_{hk}$ denotes the probability of transitioning from state h into state k, $(\mu_k^D, \sigma_k^D)$ denote the Gaussian distributions for the residence time in state k (the superscript "D" is not an index, and is intended merely to indicate the relationship with the residence time (duration)), and $\gamma_k$ is the kth component of an (associated) task-parameterized Gaussian mixed model (TP-GMM) $\gamma = \{\pi_k, \{\mu_k^{(p)}, \Sigma_k^{(p)}\}_{p=1}^{P}\}_{k=1}^{K}$, where K denotes the number of Gaussian components in the mixed model, $\pi_k$ denotes the a priori probability for the kth component, and $\mu_k^{(p)}$, $\Sigma_k^{(p)}$ are the average value and the covariance, respectively, of the kth component in coordinate system $p \in TP$.

According to various specific embodiments, control model 200 may include a precondition model 204 ($\gamma_{1,a}$). Precondition model 204 may include, for each initial state of robot trajectory model 206, a probability distribution of robot configurations prior to executing the associated skill (for example, a pickup or a movement). For example, precondition model 204 may include, for each initial state of robot trajectory model 206, a probability distribution of robot configurations before the pickup is carried out.

Precondition model 204 ($\gamma_{1,a}$) may be a TP-GMM. Precondition model 204 ($\gamma_{1,a}$) may be described by $$\gamma_{1,a}(s, p_F) \triangleq \left\{\left(\mu_{1,o}^{(p)}, \Sigma_{1,o}^{(p)}\right), \forall p \in TP_a \setminus \{o\}\right\}_{o \in O_a \cup F_a}, \quad (2)$$

where $p_F$ are optimal free task parameters, and ($\mu_{1,o}^{(p)}$; $\Sigma_{1,o}^{(p)}$) is a Gaussian distribution (average value and covariance of the Gaussian distribution) of an initial pose of an object $o \in O_a$ at point in time 1 from the perspective of the initial pose of object p at initial point in time 1. As described, precondition model 204 ($\gamma_{1,a}$) describes (for example, models) the state of the system prior to executing skill a. According to various specific embodiments, for an initial state s, precondition model 204 may include a probability distribution of robot configurations prior to executing associated skill a (for example, pickup or movement). According to various specific embodiments, precondition model 204, with reference to equation (2), may have a probability distribution of task parameters $TP_a$ of robot configurations prior to executing associated skill a. At least one set of task parameters $TP_a$ may be associated with each skill $a \in A$. According to various specific embodiments, task parameters $TP_a$ and the pickup robot configurations may be converted into one another (cf. reference [2], for example). As described, the particular associated task parameters may be ascertained for the ascertained one or multiple pickup robot configurations, for example.

According to various specific embodiments, control model 200 may include an end condition model 208 ($\gamma_{T,a}$). For each end state of robot trajectory model 206, end condition model 208 may have a probability distribution of robot configurations after executing the associated skill (for example, pickup or movement). For example, for each end state of robot trajectory model 206, end condition model 208 may have a probability distribution of robot configurations after carrying out the pickup.

End condition model 208 ($\gamma_{T,a}$) may be a TP-GMM. End condition model 208 ($\gamma_{T,a}$) may be described by $$\gamma_{T,a}(s, p_F) \triangleq \left\{ \left( \mu_{T,o}^{(p)}, \Sigma_{T,o}^{(p)} \right), \forall\, p \in TP_a \right\}_{o \in O_a}, \qquad (3)$$

where ($\mu_{T,o}^{(p)}$, $\Sigma_{T,o}^{(p)}$) is the Gaussian distribution (average value and) covariance of the Gaussian distribution) of the final (for example, resulting) pose of object o∈$O_a$, at point in time T from the perspective of the initial pose of object p. As described, end condition model $\gamma_{T,a}$ describes (for example, models) the change in the state of the system after executing skill a (for example, pickup or movement).

Further details concerning robot trajectory model 206 as a TP-HSMM, precondition model 204 ($\gamma_{1,a}$) as a TP-GMM, and end condition model 208 ($\gamma_{T,a}$) as a TP-GMM are described in reference [3].

According to various specific embodiments, precondition model 204, robot trajectory model 206, and/or end condition model 208 may be ascertained by learning from demonstrations (cf., for example, the description for FIGS. 4 and 5 and reference [3]).

Figure 3A:
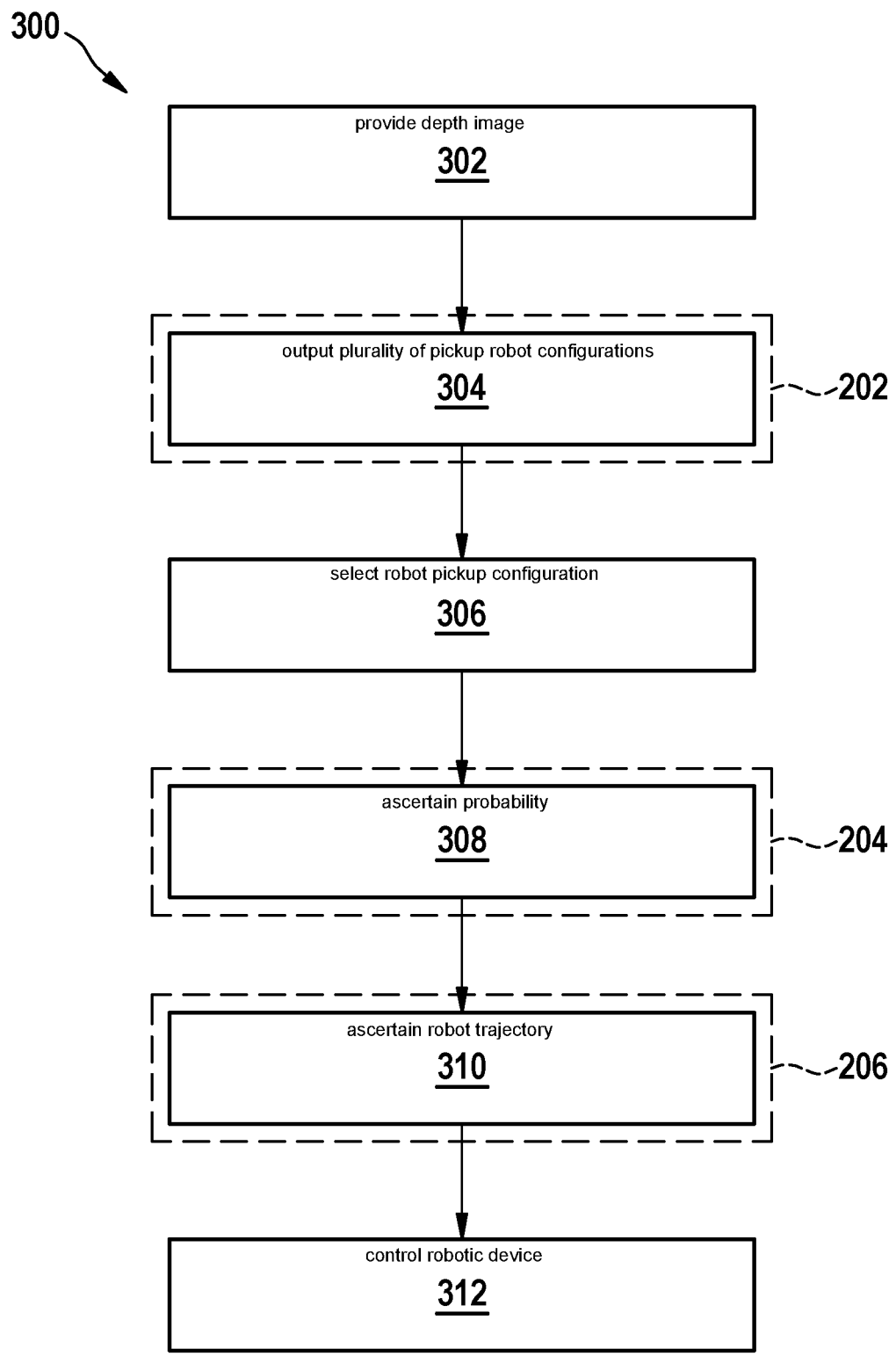
FIG. 3A shows a flowchart for controlling a robotic device according to various specific embodiments of the present invention.

FIG. 3A shows a flowchart 300 for controlling robotic device 101 according to various specific embodiments. Flowchart 300 may be a flowchart for controlling robotic device 101 during operation.

According to various specific embodiments, robotic device 101 may be controlled with the aid of control device 106 using robot control model 112, which may include control model 200. Robot control model 112 may be implemented by computer 110. According to various specific embodiments, the processing described below may be carried out using computer 110.

According to various specific embodiments, at least one depth image 302 may be provided. Depth image 302 may be a depth image that is provided by depth camera 113. Depth image 302 may show the one or multiple objects 114. Depth image 302 may be an RGB-D image, for example. According to various specific embodiments, a depth image described herein may be any type of image that includes depth information. As described, a depth image may include three-dimensional information concerning one or multiple objects. A depth image described herein may include a point cloud, for example, that is provided by a LIDAR sensor and/or a radar sensor. A depth image may be, for example, an image that includes depth information and that is provided by a LIDAR sensor.

According to various specific embodiments, object pickup model 202, in response to an input of depth image 302, may output a plurality of pickup robot configurations 304 having a respective associated probability of success. For example, for at least one object of the one or multiple objects 114 showing depth image 302, object pickup model 202 may output a plurality of pickup robot configurations 304 having a respective associated probability of success. For example, for multiple objects of the one or multiple objects 114 (for example, the one or multiple objects 114 may be a plurality of objects) showing depth image 302, object pickup model 202 may output in each case at least one pickup robot configuration 304 having an associated probability of success. As described, object pickup model 202 may process depth image 302 and may ascertain a plurality of pickup robot configurations 304. Each pickup robot configuration of the plurality of pickup robot configurations 304 may be associated with an object of the one or multiple objects 114. According to various specific embodiments, object pickup model 202 may include one or multiple neural networks.

The one or multiple neural networks, in response to an input of a depth image, may be configured to output one or multiple pickup robot configurations having a respective associated probability of success. The one or multiple neural networks, in response to an input of a depth image and a plurality of pickup robot configurations, may be configured to output a particular probability of success for each pickup robot configuration of the input plurality of pickup robot configurations.

A neural network may include or be any type of neural network, such as an autoencoder network, a convolutional neural network (CNN), a variational autoencoder (VAE) network, a sparse autoencoder (SAE) network, a recurrent neural network (RNN), a deconvolutional neural network (DNN), a generative adversarial network (GAN), a forward-thinking neural network, a sum-product neural network, etc. The neural network may include any number of layers, and the trained neural network may have been trained with the aid of any type of training principle, such as backpropagation.

Figure 3D:
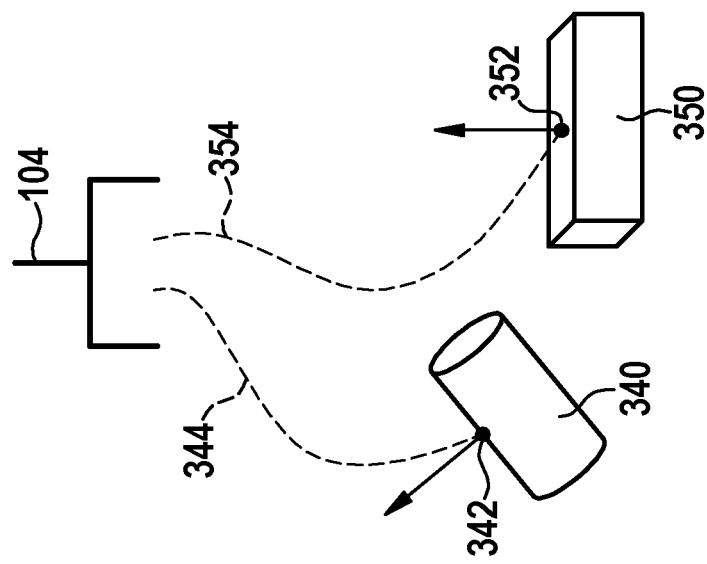
FIGS. 3B through 3D show examples of objects to be picked up according to various specific embodiments of the present invention.

According to various specific embodiments, computer 110 may be configured to select a pickup robot configuration of the plurality of pickup robot configurations 304 as a function of the particular probabilities of success of the plurality of pickup robot configurations 304. For example, computer 110 may be configured to select the pickup robot configuration of the plurality of pickup robot configurations 304 having the highest (i.e., the greatest) associated probability of success. According to various specific embodiments, a robot trajectory for picking up the object associated with the selected pickup robot configuration may be ascertained with the aid of robot trajectory model 206 for the selected pickup robot configuration of the plurality of pickup robot configurations 304 (for example, the pickup robot configuration of the plurality of pickup robot configurations 304 having the highest associated probability of success). According to various specific embodiments, control device 106 may be configured to control, with the aid of the robot trajectory, robotic device 101 for carrying out the pickup of the object associated with the selected pickup robot configuration. As described, control device 106 may control robotic device 101 in such a way that robotic device 101 implements the ascertained robot trajectory and picks up the associated object. One example of such is illustrated in FIG. 3B. Depth image 302 may show an object 320, for example. In this example, object pickup model 202 may ascertain the highest probability of success for picking up with the aid of end effector 104 for a pickup robot configuration 322. According to various specific embodiments, robot trajectory model 206 may ascertain a robot trajectory 324 for pickup robot configuration 322. Control device 106 may be configured to control robotic device 101 for carrying out the pickup of object 320 with the aid of robot trajectory 324.

According to various specific embodiments, computer 110 may be configured to select one or multiple pickup robot configurations 306 of the plurality of pickup robot configurations 304 with which a probability of success above a predefined threshold value (in certain aspects, also referred to as success threshold value) is associated. For example, computer 110 may ascertain one or multiple pickup robot configurations 306 of the plurality of pickup robot configurations 304 having a probability of success greater than 70% (for example, greater than 70%, greater than 80%, greater than 90%, greater than 95%, etc.). According to various specific embodiments, computer 110 may be configured to ascertain a predefined minimum number of pickup robot configurations. For example, computer 110 may be configured to ascertain at least one pickup robot configuration (for example, exactly one pickup robot configuration, at least two pickup robot configurations, at least three pickup robot configurations, etc.). According to various specific embodiments, computer 110 may be configured to ascertain the predefined minimum number of pickup robot configurations as a function of the associated probabilities of success. For example, computer 110 may ascertain the pickup robot configurations having the highest probability of success or highest probabilities of success as the one or multiple pickup robot configurations 306. As described, in one example computer 110 may ascertain all pickup robot configurations above the success threshold value as the one or multiple pickup robot configurations 306, and if the number of ascertained pickup robot configurations is less than the predefined minimum number of pickup robot configurations, may ascertain the pickup robot configurations having the highest probability of success as the one or multiple pickup robot configurations 306, so that the minimum number of pickup robot configurations is met.

According to various specific embodiments, computer 110 may ascertain a particular probability using precondition model 204 for the one or multiple pickup robot configurations 306. As described, computer 110 may ascertain one or multiple probabilities 308 (in certain aspects, also referred to as execution probabilities), for which one or multiple pickup robot configurations 306 are associated, using precondition model 204.

According to various specific embodiments, computer 110 may ascertain a particular associated confidence as the probability, using robot trajectory model 206 and precondition model 204 for each pickup robot configuration of the one or multiple pickup robot configurations 306. For example, computer 110 may be configured to ascertain a particular associated) confidence $c_a$, using TP-GMMs $\gamma = \{\Sigma_k, \{\mu_k^{(p)}, \Sigma_k^{(p)}\}_{p=1}^P\}_{k=1}^K$ of robot trajectory model 206 and the TP-GMMs of precondition model 204 according to equation (4) for each pickup robot configuration of the one or multiple pickup robot configurations 306:

$$c_a(s, p_F) \triangleq \log\left(\sum_{k=1}^K \pi_k \mathcal{N}\left(\xi \mid \hat{\mu}_k, \hat{\Sigma}_k\right)\right) + \sum_{o \in O_a \cup F_a} \log\left(\mathcal{N}\left(p_o \mid \hat{\mu}_{1,o}, \hat{\Sigma}_{1,o}\right)\right), \quad (4)$$

where $\xi \in M_\xi$ is the state of end effector 104, $p_o$, $o \in O_a$ are the particular states of the objects, $\{(\hat{\mu}_k, \hat{\Sigma}_k)\}$ are the combined Gaussian distributions (over states k) of the initial pose of the robot arm, based on robot trajectory model 206 ($\theta_a$) of associated skill a, and $\{(\hat{\mu}_{1,o}, \hat{\Sigma}_{1,o})\}$ are the combined Gaussian distributions (over objects $o \in O_a$) of the initial pose of a particular object o, based on precondition model 204 (cf. reference [3], for example). It is pointed out that a confidence ascertained according to equation (4) is a probability density. For the purpose of illustration, confidences ascertained according to equation (4) are also regarded as probabilities with respect to the ascertained one or multiple (execution) probabilities 308, so that the probabilities of the one or multiple (execution) probabilities 308 may also be probability densities.

According to various specific embodiments, computer 110 may be configured to select a pickup robot configuration of the one or multiple pickup robot configurations 306 as a function of the one or multiple (execution) probabilities 308 ascertained for the one or multiple pickup robot configurations 306. For example, computer 110 may be configured to select the pickup robot configuration of the one or multiple pickup robot configurations 306 having the highest associated probability (of the one or multiple probabilities 308). According to various specific embodiments, computer 110 may be configured to select the pickup robot configuration of the one or multiple pickup robot configurations 306, taking into account other and/or additional conditions. For example, individual parameters (orientations, for example) of the robot configurations, subareas of a work area on which the one or multiple objects 114 are situated, object classes that are ascertained with the aid of classification (for example, with the aid of a classification network), etc., may be taken into account (for example, preferably adversely affected by a decrease in the ascertained probabilities, for example).

According to various specific embodiments, a robot trajectory 310 for picking up the object associated with the selected pickup robot configuration may be ascertained with the aid of robot trajectory model 206 for the selected pickup robot configuration of the one or multiple pickup robot configurations 306 (for example, the pickup robot configuration of the one or multiple pickup robot configurations 306 having the highest associated probability).

According to various specific embodiments, control device 106 may be configured to control 312 robotic device 101 for carrying out the pickup of the object associated with the selected pickup robot configuration with the aid of robot trajectory 310. As described, control device 106 may control 312 robotic device 101 in such a way that robotic device 101 implements ascertained robot trajectory 310 and picks up the associated object.

The one or multiple objects 114 may encompass a plurality of objects. The ascertainment of the plurality of pickup robot configurations 304 for multiple objects of the one or multiple objects 114 (for example, of the plurality of objects) and the selection of a pickup robot configuration using precondition model 204 has the effect, for example, that the object of the one or multiple objects 114 associated with the selected pickup robot configuration is selected. As described, an object to be moved of the one or multiple objects 114 may be selected in this way. For example, an object to be moved of the one or multiple objects 114 may be selected in such a way that relationships of the object to be moved with respect to other objects, as well as the geometric conditions of robotic device 101 (of a robot arm 120, for example), are taken into account.

Figure 3C:
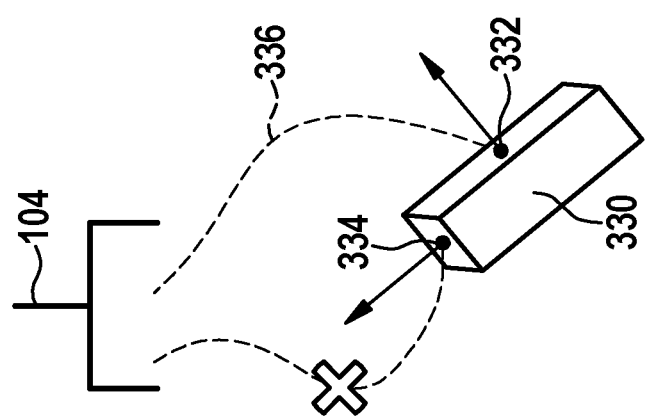
Figure 3B:
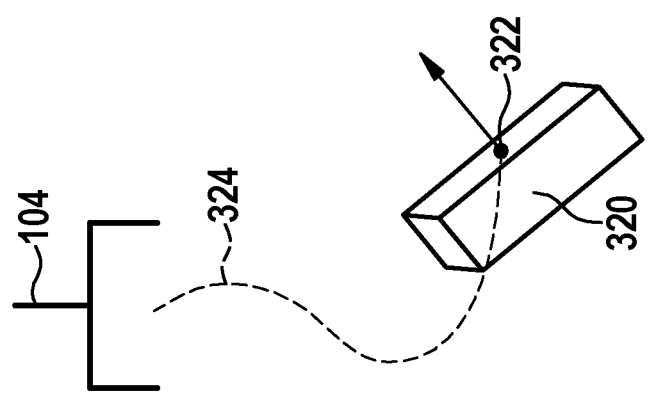

One example of such is illustrated in FIG. 3C. Depth image 302 may show an object 330, for example. In this example, object pickup model 202 may ascertain a particular probability of success above the success threshold value for picking up with the aid of end effector 104 for a first pickup robot configuration 332 and for a second pickup robot configuration 334. As described, the one or multiple pickup robot configurations 306 may include first pickup robot configuration 332 and second pickup robot configuration 334. According to various specific embodiments, precondition model 204 may ascertain a respective probability (for example, a respective confidence $c_a$) for first pickup robot configuration 332 and second pickup robot configuration 334. As described, the one or multiple probabilities 308 may have a first probability (a first confidence, for example) for first pickup robot configuration 332, and a second probability (a second confidence, for example) for second pickup robot configuration 334. In this example, the first probability may be greater than the second probability, and computer 110 may be configured to select first pickup robot configuration 332 that is associated with the first probability. According to various specific embodiments, robot trajectory model 206 may ascertain a robot trajectory 336 for selected pickup robot configuration 332. Control device 106 may be configured to control robotic device 101, with the aid of robot trajectory 336, for carrying out the pickup of object 330. FIG. 3D represents an example in which depth image 302 may show a first object 340 and a second object 350. According to various specific embodiments, precondition model 204 may ascertain for first object 340 the highest probability (for example, the greatest confidence) for a pickup robot configuration 342, and robot trajectory model 206 may ascertain a robot trajectory 344 for pickup robot configuration 342. According to various specific embodiments, precondition model 204 for second object 350 may ascertain the highest probability (for example, the greatest confidence) for a pickup robot configuration 352, and robot trajectory model 206 may ascertain robot trajectory 354 for pickup robot configuration 352.

According to various specific embodiments, control device 106 may be configured to control robotic device 101 for carrying out the pickup of an object and a subsequent movement of the picked-up object.

Robot trajectory model 206 may include a hidden semi-Markov model $\theta_a$ for picking up an object as associated skill a, and a hidden semi-Markov model $\theta_a$ for moving a picked-up object as associated skill a. Precondition model 204 may include a TP-GMM $\gamma_{1,a}$ for picking up an object as associated skill a, and a TP-GMM $\gamma_{1,a}$ for moving a picked-up object as associated skill a. End condition model 208 may include a TP-GMM $\gamma_{T,a}$ for picking up an object as associated skill a, and a TP-GMM $\gamma_{T,a}$ for moving a picked-up object as associated skill a.

According to various specific embodiments, control model 200 may ascertain a robot configuration after carrying out the pickup of the object, using the TP-GMM of end condition model 208 that is associated with the pickup. According to various specific embodiments, robot trajectory model 206 may ascertain a robot trajectory for moving the object, using the robot configuration that is ascertained with the aid of end condition model 208. According to various specific embodiments, control device 106 may control robotic device 101 for carrying out the movement of the object with the aid of the ascertained robot trajectory, using control model 112.

According to various specific embodiments, computer 110 may ascertain a particular associated first confidence $c_a$ for picking up the object associated with the robot configuration as skill a, using robot trajectory model 206 and precondition model 204 according to equation (4) for each pickup robot configuration of the one or multiple pickup robot configurations 306. Robot trajectory model 206 may ascertain a robot trajectory for executing the pickup skill for each pickup robot configuration of the one or multiple pickup robot configurations 306. End condition model 208 may ascertain a robot configuration that results from the particular robot trajectory. According to various specific embodiments, computer 110 may ascertain a particular associated second confidence $c_a$ for moving the picked-up object associated with the particular robot configuration as skill a, using robot trajectory model 206 and precondition model 204 according to equation (4) for each robot configuration that is ascertained with the aid of end condition model 208.

As described, a first (selection) probability (the first confidence) for executing the pickup skill and a second (selection) probability (the second confidence) for executing the movement skill may be ascertained for each pickup robot configuration of the one or multiple pickup robot configurations 306.

According to various specific embodiments, computer 110 may select a pickup robot configuration of the one or multiple pickup robot configurations 306 as a function of the first confidence and the second confidence that are ascertained for the one or multiple pickup robot configurations 306.

For example, computer 110 may preselect all pickup robot configurations 306 of the one or multiple pickup robot configurations having a first confidence above a predefined first confidence threshold value (for example, a first confidence threshold value greater than 50%, greater than 60%, greater than 70%, greater than 80%, greater than 90%, etc.). As described, all pickup robot configurations of the one or multiple pickup robot configurations 306 having a minimum probability for the execution may be preselected.

For example, computer 110 may ascertain a pickup robot configuration of the preselected pickup robot configurations, using the particular ascertained first confidence and second confidence of the preselected pickup robot configurations. For example, computer 110 may select the pickup robot configuration of the preselected pickup robot configurations having the highest overall probability. The overall probability may be, for example, a weighted sum of the first confidence and the second confidence.

According to various specific embodiments, a particular robot trajectory 310 for picking up the object associated with the selected pickup robot configuration and for moving the picked-up object may be ascertained with the aid of robot trajectory model 206 for the selected pickup robot configuration of the one or multiple pickup robot configurations 306. According to various specific embodiments, control device 106 may be configured to control 312 robotic device 101 for carrying out the pickup and the subsequent movement of the object.

FIG. 4 shows a flowchart 400 of learning from demonstrations according to various specific embodiments.

To teach a robot a skill, such as moving according to a desired trajectory, kinesthetic demonstrations may be carried out in which the robot is directly moved, for example by physical displacement or via remote control. In addition to the experience necessary for this purpose, the safety risks, and the requirements (for example for tasks that require precise movements), the movement of the robot is also much less intuitive for a human to carry out a task, compared to the use of his/her own hands.

With regard to the above discussion, according to various exemplary embodiments an approach is provided which allows a human user to teach a robot an activity (skill) by simply performing the activity him/herself. In the process, demonstrations are recorded, for example, by tracking the hand of the user (and optionally the involved objects) instead of recording the trajectory of the end effector. Demonstrations are then used for learning a compact mathematical representation of the skill, which may be used (by control device 106, for example) for this skill to be reproduced by the robot in new scenarios (for example, new relative positions between the robot and the object to be manipulated).

Various exemplary embodiments are based on the technical advances in two areas: First, the tracking of a hand based on camera images in areas where robots are used, for example in factories, is typically available; second, methods for training robots based on human demonstrations enable efficient learning by the robot (i.e., training of the robot) as well as flexible reproduction. Task-parameterized hidden semi-Markov models (TP-HSMMs), which enable a task parameter-dependent representation of learned movement skills, are one example.

The tracking of objects and human hands is an active field of research (in particular in machine vision), and is of major importance for industrial applications. In contrast to the application of such techniques to human-machine interaction (for video games, for example), according to various specific embodiments it is used for the training (teaching) of and learning by robots.

In a demonstration phase, a user (or in general, a demonstrating entity) demonstrates the desired skill. The demonstration is recorded. For example, a video recording is produced with the aid of a camera, and the sequence of the positions of a hand of the user (in general, of a part of the demonstrating entity) is ascertained from the images of the video and represented in the form of a trajectory. This is repeated for multiple demonstrations 402. It should be noted that this may take place in a decoupled manner; for example, a set of videos is used that was recorded beforehand without the intention of teaching a robot a skill.

According to various specific embodiments, robot trajectory model 206, precondition model 204, and/or end condition model 208 may be learned using demonstrations 402.

A mathematical model is learned in a learning or training phase, based on the collected demonstrations. For example, a TP-HSMM containing a hand pose as one of the task parameters is learned. A "pose" contains, for example, information concerning the position and/or orientation, or also concerning a state (for example, "hand closed" versus "hand open").

FIG. 5 shows an arrangement 500 for recording demonstrations of a user according to various specific embodiments.

A computer may be configured to create model 200. The computer may be computer 110 of control device 106, for example. As described herein, control model 200 may also be created (for example, learned) when robotic device 101 is not in operation; thus, for example, the computer may be a computer that is different from computer 110. For example, control model 200 may be learned spatially separate from robotic device system 100.

A user 501 demonstrates a skill by moving his/her hand 502. For example, the user takes an object 504 from a first position 505 and moves it to a second position 506. A camera 507 records the movement of the user. Multiple cameras may also be provided which record the demonstration from various viewing angles, in particular from the viewpoint of starting position 505 and from the viewpoint of end position 506 of object 504.

Each demonstration is thus represented as a sequence of images that are supplied to a control unit 508, which corresponds to control device 106, for example. Control unit 508 may include a computer, for example, for carrying out computations. Control unit 508 learns, based on the demonstrations, a statistical model 509, such as a robot trajectory model 206 and/or TP-GMMs (for example, precondition model 202 or end condition model 208 as described herein). It is also assumed that each demonstration is recorded from perspective P of different coordinate systems TP, which are referred to as task parameters.

For example, at the end of the demonstration phase the demonstrations may be abstracted (for example, represented as patterns of coordinates of hand 502 or of object 504) and stored as trajectories (for example, of hand 502 or of object 504, or also of multiple hands and/or multiple objects), for example in a memory of control unit 508.

With reference to FIG. 4, a TP-HSMM enables efficient learning as well as flexible reproduction for learning robot capabilities from human demonstrations. More precisely, the recorded trajectory of user's hand 502 as a desired movement to be learned is involved, while the trajectory of object 504 is used to generate different task parameters, which represent different configurations of the work area, for the skill. The task parameters may be ascertained based on the present state, for example. The task parameters may be freely selected, for example.

According to various specific embodiments, a robot trajectory model 206 may be ascertained using demonstrations 402. Robot trajectory model 206 may be a TP-HSMM.

According to one specific embodiment, a task-parameterized HSMM (TP-HSMM) such as robot trajectory model 206 is represented by $$\theta = \{\{a_{hk}\}_{h=1}^{K}, (\mu_{k}^{D}, \sigma_{k}^{D}), \gamma_{k}\}_{k=1}^{K}. \quad (1)$$

The TP-GMM describes the output probabilities (or emission probabilities, i.e., probabilities for the observations) for each state k=1, . . . K. Such a mixed model, in contrast to simple GMMs, cannot be independently learned for each coordinate system. The reason is that mixed coefficients $\Sigma_k$ are shared by all coordinate systems (i.e., apply for all coordinate systems), and the kth component in coordinate system p must correspond to the kth component in the global coordinate system. The expectation maximization (EM) algorithm is one option for learning such models (i.e., training).

When a TP-GMM is trained, it may be used to reproduce a trajectory for a learned capability or skill during the execution by control unit 508 and/or control device 106.

However, for an HSMM, a priori probabilities $\pi_k$ describe only the probability distribution for the initial components with t=1. The probabilities at later points in time are provided by the underlying semi-Markov model.

In this considered TP-HSMM, each state corresponds to a Gaussian component in the associated TP-GMM.

Robotic device 101 may operate in a static, known work environment. Within the range of robotic device 101 (in certain aspects, referred to as a robot), there are objects (of interest) that are referred to as $O=\{o_1, o_2, \ldots, o_J\}$. Each object may be described by its state $p_o$.

In addition, it is assumed that there is a set of core manipulation skills which allows the robot to manipulate (for example, move) the objects. The set of these core manipulation skills is referred to as $A=\{a_1, a_2, \ldots, a_H\}$.

For each activity (corresponding to a skill), user 501 carries out multiple demonstrations which define how robotic device 101 is to perform them. In particular, for a skill a∈A an object set $O_a \subseteq O$ is involved, and the set of demonstrations is referred to as $D_a=\{D_1, \ldots, D_{M_a}\}$, each demonstration being referred to as $$D_m = [s_t]_{t=1}^{T_m} = [(r_t, \{p_{t,o}, o \in O_a\})]_{t=1}^{T_m}, \quad (7)$$

where r is the state of end effector 104, $D_m$ is a sequence of states s, each state indicating desired state r (at point in time t), which has been ascertained from the tracking of the hand (by recording camera images), and object states {$p_o$, $o \in O_a$}. By combining these skills, robotic device 101 may manipulate particular objects so that they reach a desired end state. With regard to TP-GMMs $\gamma = \{\pi_k, \{\mu_k^{(p)}, \Sigma_k^{(p)}\}_{p=1}^P\}_{k=1}^K$, each p may be a task parameter of a set of task parameters TP. At least one set of task parameters $TP_a$ may be associated with each skill $a \in A$. For example, a skill $a \in A$ may be executed using a set of task parameters $TP_a$. According to various specific embodiments, a particular set of task parameters $TP_a$ may be described with the aid of union set $TP_a = O_3 \cup F_a \cup \{r\}$, where $F_a$ is a set of free task parameters of skill $a \in A$.

The TP-HSMM is trained in the learning phase (by control unit 508, for example) based on demonstrations $$D_m = [s_t]_{t=1}^{T_m} = [(r_t, \{p_{t,o}, o \in O_a\})]_{t=1}^{T_m}$$

of user 501, for example according to an expectation maximization (EM) procedure.

Values for parameter set $\theta = \{\{a_{hk}\}_{h=1}^K, (\mu_k^D, \sigma_k^D), \gamma_k\}_{k=1}^K$, which characterize the TP-HSMM, are the result of the training.

According to various specific embodiments, control device 106 may control robotic device 101, using TP-HSMM robot trajectory model 206, in order to perform an activity, for example for a new scenario. For example, control device 106 may use robot trajectory model 206 to ascertain a reference trajectory for the new scenario, and controls robotic device 101 in such a way that it follows the reference trajectory. The term "scenario" refers to a specific selection of the modeled task parameters (for example, starting position 505 or present position and target position 506; for example, present state and target state). According to various specific embodiments, one or multiple TP-GMMs may be ascertained (with the aid of control device 508, for example). For example, in the learning phase a precondition model $\gamma_{1,a}$, such as precondition model 202, may be trained or learned. For example, in the learning phase an end condition model $\gamma_{T,a}$, such as end condition model 208, may be trained or learned.

Precondition model $\gamma_{1,a}$ may be described by $$\gamma_{1,a}(s, p_F) \triangleq \left\{ \left( \mu_{1,o}^{(p)}, \Sigma_{1,o}^{(p)} \right), \forall p \in TP_a \setminus \{o\} \right\}_{o \in O_a \cup F_a} \quad (2)$$

End condition model $\gamma_{T,a}$ may be described by $$\gamma_{T,a}(s, p_F) \triangleq \left\{ \left( \mu_{T,o}^{(p)}, \Sigma_{T,o}^{(p)} \right), \forall p \in TP_a \right\}_{o \in O_a} \quad (3)$$

According to various specific embodiments, a skill-specific multiplicity $\mathcal{M}_a$ may be described with the aid of TP-HSMM robot trajectory model 206, precondition model 202 ($\gamma_{1,a}$), and end condition model 208 ($\gamma_{T,a}$) according to equation (5):

$$\mathcal{M}_a = (\theta_a, \gamma_{1,a}, \gamma_{T,a}). \quad (5)$$

As described, TP-HSMM robot trajectory model 206 describes (for example, models) the trajectory of a skill a. As described, precondition model 202 ($\gamma_{1,a}$) and end condition model 208 ($\gamma_{T,a}$) describe (for example, model) the geometric relationships between robotic device 101 and objects $o \in O_a$. As described, precondition model 202 ($\gamma_{1,a}$), end condition model 208 ($\gamma_{T,a}$), and TP-HSMM robot trajectory model 206 may form a skills database.

According to various specific embodiments, robot trajectory model 206 may describe the trajectory of a skill for picking up an object, and may be trained using demonstrations for carrying out the pickup of an object. According to various specific embodiments, precondition model 204 may include a TP-GMM for a skill for picking up an object, and may be trained using demonstrations for carrying out the pickup of an object. According to various specific embodiments, end condition model 208 may include a TP-GMM for a skill for picking up an object, and may be trained using demonstrations for carrying out the pickup of an object.

According to various specific embodiments, robot trajectory model 206 may describe the trajectory of a skill for moving a picked-up object, and may be trained using demonstrations for carrying out the movement of a picked-up object. According to various specific embodiments, precondition model 204 may include a TP-GMM for a skill for moving a picked-up object, and may be trained using demonstrations for carrying out the movement of a picked-up object. According to various specific embodiments, end condition model 208 may include a TP-GMM for a skill for moving a picked-up object, and may be trained using demonstrations for carrying out the movement of a picked-up object.

Further details concerning learning from demonstrations, for example with regard to the training of robot trajectory model 206 as a TP-HSMM and the training of precondition model 202 ($\gamma_{1,a}$), and of end condition model 208 ($\gamma_{T,a}$) (in certain aspects, also referred to as an effect model) are described in reference [3].

A robot trajectory may be ascertained with low computing complexity with the aid of the models (for example, robot trajectory model 206, precondition model 204, end condition model 208) learned from demonstrations.

Figure 6:
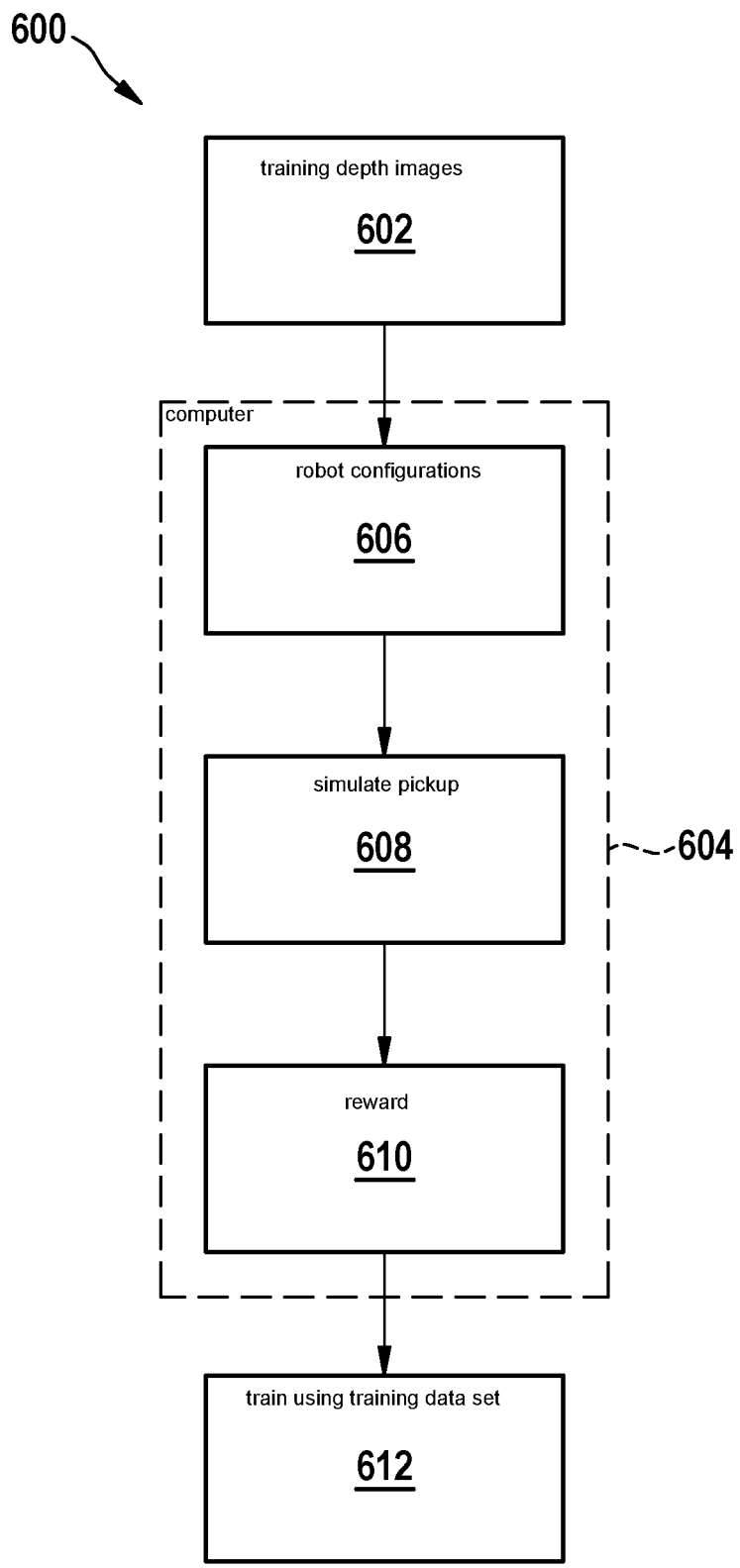
FIG. 6 shows a flowchart for training an object pickup model according to various specific embodiments of the present invention.

FIG. 6 shows a flowchart 600 for training an object pickup model such as object pickup model 202 according to various specific embodiments. According to various specific embodiments, object pickup model 202 may be trained when robotic device 101 is not being operated.

According to various specific embodiments, object pickup model 202 may be trained using a plurality of training depth images 602. Each training depth image of the plurality of training depth images 602 may show at least one object of a plurality of objects. For example, each training depth image of the plurality of training depth images 602 may show multiple objects of the plurality of objects.

According to various specific embodiments, each training depth image of the plurality of training depth images 602 may be processed as follows with the aid of a computer 604:

According to various specific embodiments, a point cloud may be ascertained for each training depth image of the plurality of training depth images 602. For the purpose of illustration, the processing of a training depth image is described below. It is pointed out that the processing described for the training depth image may also be carried out for a point cloud that is generated for the particular training depth image.

According to various specific embodiments, a pickup model may ascertain one or multiple pickup robot configurations 606 for the particular training depth image. Each pickup robot configuration of the one or multiple pickup robot configurations 606 may be associated with one object of the objects shown in the particular training depth image. A particular robot configuration may include, for example, an end effector position and an end effector rotation (for example, an end effector orientation). A particular robot configuration may, for example, be a 6D configuration of the end effector, which encompasses the 3D position and the orientation (orientation in 3D space, for example). The pickup model may ascertain a surface contact point as a pickup robot configuration for a suction device, for example. The pickup model may ascertain two oppositely situated points as a pickup robot configuration for a gripping device, for example.

According to various specific embodiments, computer 604 may be configured to simulate 608 a pickup of the particular associated object for each pickup robot configuration of the one or multiple pickup robot configurations 606. For example, a pickup may be simulated 608 multiple times for each pickup robot configuration of the one or multiple pickup robot configurations 606. For each simulation 608 it may be ascertained whether or not the pickup of the particular object is successful. For each simulation 608 a reward 610 may be ascertained as a function of whether or not the pickup of the particular object is successful. As described, each simulation 608 may simulate a pickup and a lift of the object, and may ascertain a success or failure as a reward 610. For example, a predefined maximum reward (for example, a value of the reward equal to "1") may be ascertained if the pickup is successful. For example, a predefined minimum reward (for example, a value of the reward equal to "0") may be ascertained if the pickup is not successful.

According to various specific embodiments, the pickup of a particular object may be simulated with the aid of the particular associated pickup robot configuration, using a physical simulation model (for example, a CAD-based physical simulation model).

According to various specific embodiments, the pickup of a particular object may be simulated with the aid of the particular associated pickup robot configuration, using robot trajectory model 206 and/or precondition model 204. For example, the pickup of a particular object may be simulated using robot trajectory model 206, precondition model 204, and/or end condition model 208.

As described, in this way at least one particular associated reward of one or multiple rewards 610 may be ascertained for each pickup robot configuration of the ascertained one or multiple pickup robot configurations 606.

According to various specific embodiments, the plurality of training depth images 602, the one or multiple pickup robot configurations 606 associated with each training depth image of the plurality of training depth images 602, and reward 610 associated with each pickup robot configuration of the one or multiple pickup robot configurations 606 of each training depth image of the plurality of training depth images 602 form a training data set.

According to various specific embodiments, object pickup model 202 may be trained 612 using the training data set. Object pickup model 202 may be implemented with the aid of computer 604. Object pickup model 202 may be trained with the aid of computer 604.

According to various specific embodiments, object pickup model 202 may be trained, using the plurality of training depth images 602, pickup robot configurations 606, and rewards 610, in such a way that trained object pickup model 202, in response to an input of a depth image, outputs a plurality of pickup robot configurations 606 having a respective associated probability of success.

Object pickup model 202 as described herein may include a neural network. Object pickup model 202 may be trained using a backpropagation algorithm, for example.

According to various specific embodiments, object pickup model 202 may be trained, using the training data set, in such a way that trained object pickup model 202, in response to an input of a depth image, ascertains a plurality of pickup robot configurations for the objects shown in the depth image, associates a particular probability of success with each pickup robot configuration of the plurality of pickup robot configurations, and outputs multiple pickup robot configurations of the plurality of pickup robot configurations having a probability of success above a predefined threshold value as the plurality of pickup robot configurations 606.

According to various specific embodiments, object pickup model 202 may be trained, using the training data set, in such a way that trained object pickup model 202, in response to an input of a depth image, outputs the plurality of pickup robot configurations 606 having a respective associated probability of success. As described, a neural network of object pickup model 202 may be trained to generate, for a depth image, pickup robot configurations together with associated probabilities of success.

According to various specific embodiments, object pickup model 202 may be trained in such a way that an expected reward is increased (for example, maximized). According to various specific embodiments, object pickup model 202 may be trained with the aid of machine learning. For example, object pickup model 202 may be trained to increase the expected reward with the aid of reinforcement learning. For example, object pickup model 202 may be trained with the aid of deep learning. According to various specific embodiments, by use of the ascertained rewards an error value may be ascertained and object pickup model 202 may be trained to reduce (for example, minimize) the error value, for example with the aid of backpropagation.

According to various specific embodiments, computer 604 may be configured to simulate 608, for each pickup robot configuration of the one or multiple pickup robot configurations 606, a pickup of the particular associated object and a subsequent movement of the picked-up object. The pickup and subsequent movement as used herein may, for example, involve transporting the object into a target area. A movement of an object as used herein may encompass a change in the position of the object.

For example, a pickup and subsequent movement may be simulated 608 multiple times for each pickup robot configuration of the one or multiple pickup robot configurations 606. For each simulation 608 it may be ascertained whether or not the pickup and subsequent movement of the particular object is successful. For each simulation 608, a reward 610 may be ascertained as a function of whether or not the pickup and subsequent movement of the particular object is successful. As described, each simulation 608 may simulate a pickup of the object and a movement of the picked-up object, and may ascertain success or failure as a reward 610. For example, the pickup and subsequent movement may be successful if the object can be picked up and if the picked-up object can be moved (for example, transported) to a destination point (for example, a destination area). For example, a predefined maximum reward (for example, a value of the reward equal to "1") may be ascertained if the pickup as well as the subsequent movement is successful. For example, a predefined minimum reward (for example, a value of the reward equal to "0") may be ascertained if the pickup and/or the movement are/is not successful.

According to various specific embodiments, the pickup and the subsequent movement of a particular object may be simulated using a physical simulation model (a CAD-based physical simulation model, for example). According to various specific embodiments, the pickup and subsequent movement of a particular object may be simulated using robot trajectory model 206, precondition model 204, and/or end condition model 208.

Geometric conditions of robotic device 101 and states of other objects (for example, other objects of the one or multiple objects 114, other objects situated in the work area of robot arm 120, or other robots and/or robot arms that are different from robot arm 120, etc.) are taken into account by simulating the pickup (and optionally also the subsequent movement) using robot trajectory model 206, precondition model 204, and end condition model 208. The accuracy of the ascertained probability of success may be significantly increased in this way.

According to various specific embodiments, the plurality of training depth images 602, the one or multiple pickup robot configurations 606 associated with each training depth image of the plurality of training depth images 602, and reward 610 associated with each pickup robot configuration of the one or multiple pickup robot configurations 606 of each training depth image of the plurality of training depth images 602 (ascertained for the pickup and subsequent movement) may form a training data set. According to various specific embodiments, object pickup model 202 may be trained 612 using the training data set.

As described, in this way it is possible to take into account not only the pickup of an object, but also the subsequent movement of the picked-up object when ascertaining the plurality of pickup robot configurations having the associated probabilities of success. Success of the subsequent movement (for example, a movement to a destination point) is thus also taken into account for the probability of success. The accuracy of the ascertained probability of success may be significantly increased in this way.

Figure 7:
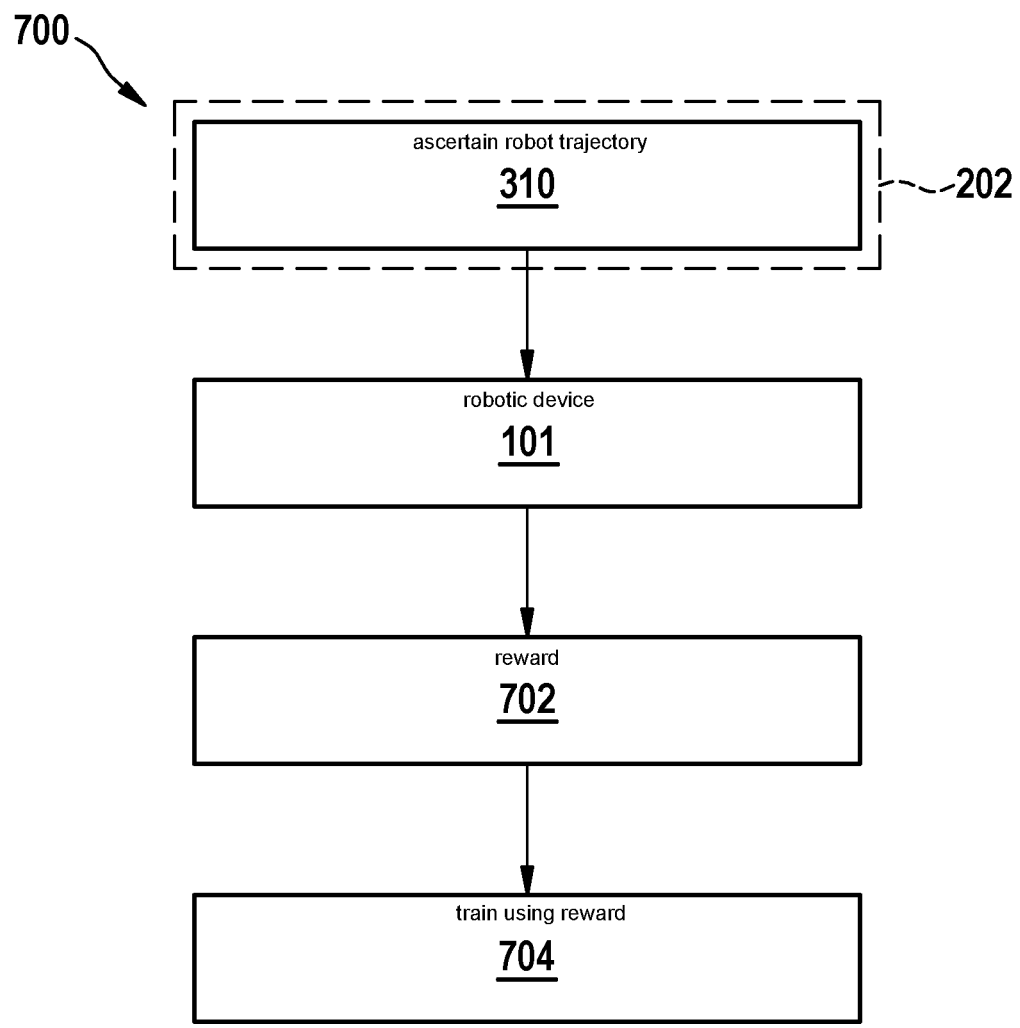
FIG. 7 shows a flowchart for the additional training of an object pickup model according to various specific embodiments of the present invention.

FIG. 7 shows a flowchart 700 for additional training of object pickup model 202 according to various specific embodiments. According to various specific embodiments, trained object pickup model 202 may be additionally trained during operation of robotic device 101.

According to various specific embodiments, control device 106 (with the aid of control model 200, for example) may control robotic device 101 for carrying out the pickup of the object with the aid of ascertained robot trajectory 310 (cf. the description for FIG. 3A, for example). According to various specific embodiments, control device 106 (computer 110, for example) may ascertain, as a reward 702, whether or not the pickup of the object was successfully carried out. For example, a predefined maximum reward (for example, a value of the reward equal to "1") may be ascertained if the pickup of the object was successfully carried out. For example, a predefined minimum reward (for example, a value of the reward equal to "0") may be ascertained if the pickup of the object was not successfully carried out.

According to various specific embodiments, control device 106 (with the aid of control model 200, for example) may control robotic device 101 for carrying out the pickup and the subsequent movement of the object with the aid of particular ascertained robot trajectory 310 (cf. the description for FIG. 3A, for example). According to various specific embodiments, control device 106 (computer 110, for example) may ascertain, as a reward 702, whether or not the pickup and subsequent movement of the object were successfully carried out. For example, a predefined maximum reward (for example, a value of the reward equal to "1") may be ascertained if the pickup and subsequent movement of the object were successfully carried out. For example, a predefined minimum reward (for example, a value of the reward equal to "0") may be ascertained if the pickup of the object and/or the movement of the object was/were not successfully carried out.

According to various specific embodiments, trained object pickup model 202 may be additionally trained 704 using the ascertained reward, the pickup robot configuration for which the pickup is/was carried out, and the depth image for which the pickup robot configuration is/was ascertained. As described, object pickup model 202 may be additionally adapted during operation, depending on whether or not ascertained pickup robot configurations result in a successful carrying out of the pickup of the associated object (and optionally also in a successful carrying out of the movement of the picked-up object).

Figure 8:
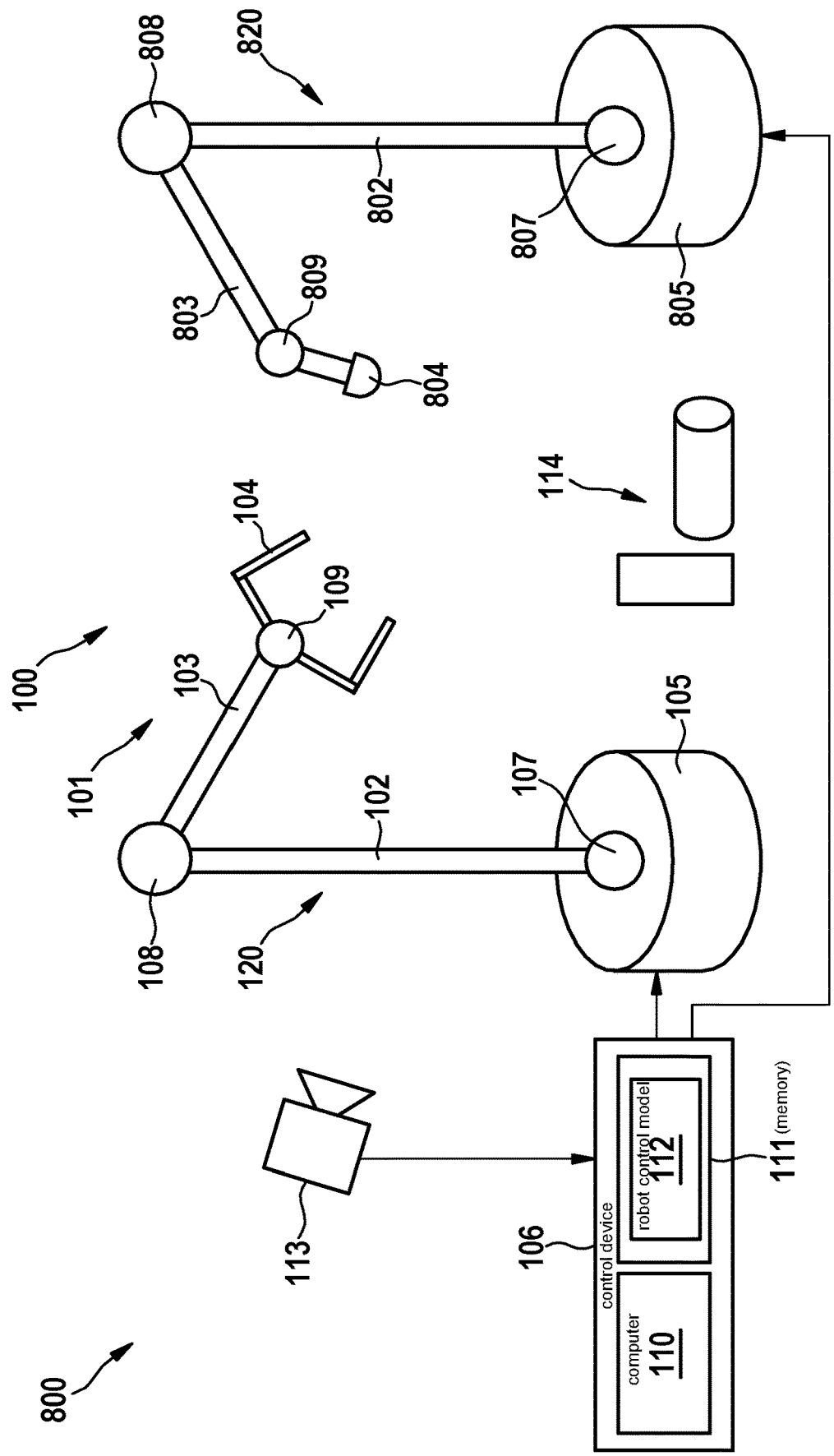
FIG. 8 shows an example of a robotic device system including multiple robot arms according to various specific embodiments of the present invention.

FIG. 8 shows an example of a robotic device system 800 including multiple robot arms, according to various specific embodiments. Robotic device system 800 includes two robot arms by way of example. It is pointed out that robotic device system 800 may include more than two robot arms.

According to various specific embodiments, robotic device system 800 may include robotic device system 100. Robot arm 120 of robotic device 101 may be a first robot arm 120. Robotic device system 800 may also include a second robot arm 820.

Robotic device system 800, shown in FIG. 8 and described below by way of example, for purposes of illustration represents one example of robotic device 101 including a first robot arm 120 and a second robot arm 820. It is pointed out that the robotic device may be any type of computer-controlled device that includes at least two manipulation devices for manipulation (for example, moving, machining, processing, etc.) of objects, such as a robot (for example, a manufacturing robot, a maintenance robot, a household robot, a medical robot, etc.), a vehicle (an autonomous vehicle, for example), a household appliance, a production machine, a personal assistant, an access control system, etc.

According to various specific embodiments, second robot arm 820 may be configured to pick up one or multiple objects 114. According to various specific embodiments, second robot arm 820 may be configured to move a picked-up object.

Second robot arm 820 may include robot members 802, 803, 804 and a base (or in general a mounting) 805 via which robot members 802, 803, 804 are supported. Control device 106 may be configured to achieve the interaction with the surroundings according to a control program. For example, control device 106 may be configured to control first robot arm 120 and second robot arm 820. Last element 804 (viewed from base 805) of robot members 802, 803, 804 is also referred to as an end effector 804, and may include one or multiple tools such as a gripping tool or a suction device (a suction head, for example) or the like.

In this example, end effector 104 of first robot arm 120 may include a gripping tool, and end effector 804 of second robot arm 820 may include a suction device for suctioning an object. Picking up an object as described herein may be, for example, gripping and/or suctioning the object. It is pointed out that this is used for illustrative description, and that first robot arm 120 and/or second robot arm 820 may be or include any other type of end effector for manipulating objects.

Second robot arm 820 may include connecting elements 807, 808, 809 that connect robot members 802, 803, 804 to one another and to base 805. Second robot arm 820, except for the particular tool of end effector 104, 804, may essentially correspond to first robot arm 120. For example, the other robot members 802, 803, base 805, and connecting elements 807, 808, 809 may be configured corresponding to the other robot members 102, 103, base 105, and connecting elements 107, 108, 109 of first robot arm 120 described herein.

Figure 9:
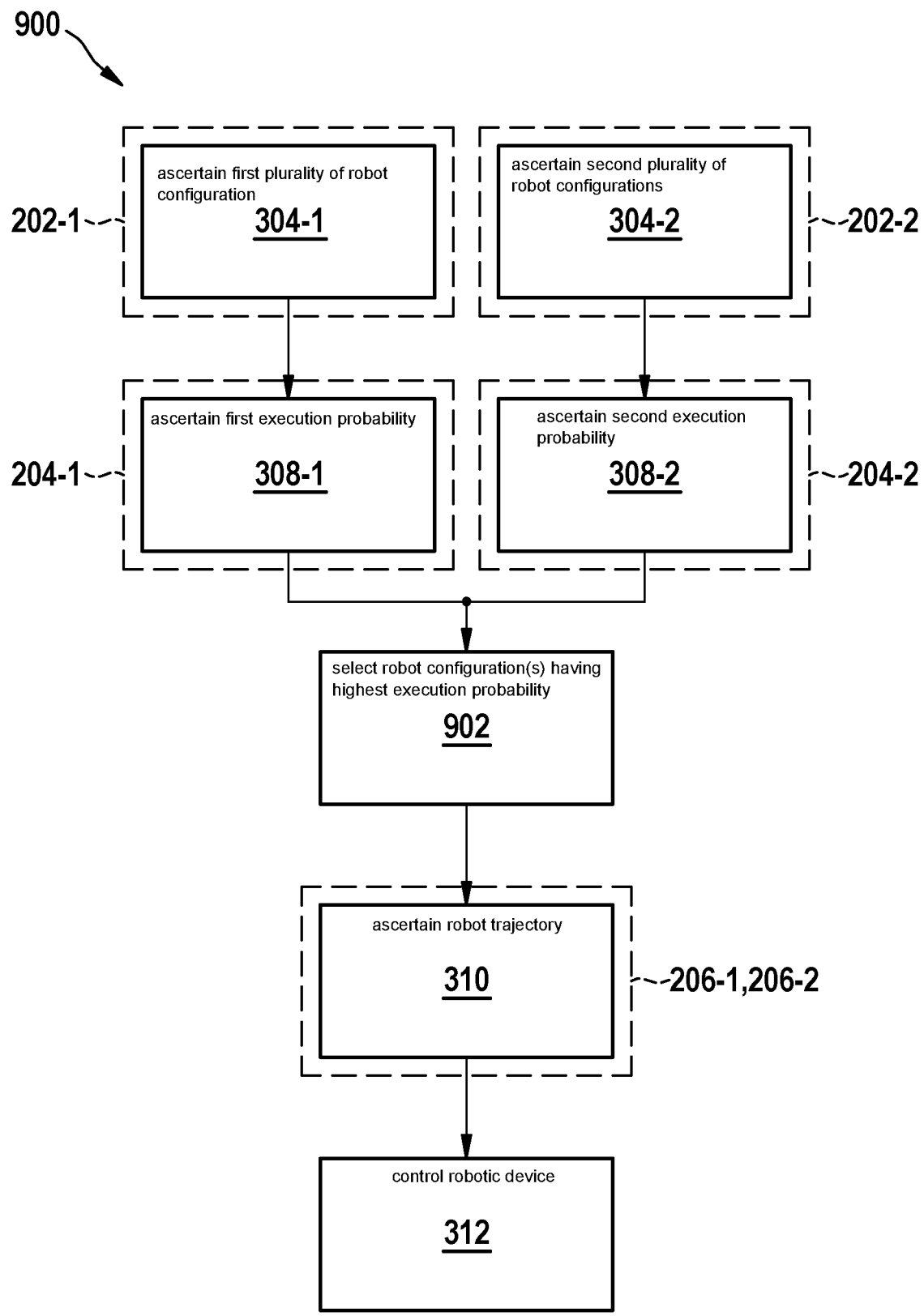
FIG. 9 shows a flowchart for controlling a robotic device including multiple robot arms according to various specific embodiments of the present invention.

FIG. 9 shows a flowchart 900 for controlling a robotic device including multiple robot arms, according to various specific embodiments. Flowchart 900 shows the control of the robotic device, including multiple robot arms, by way of example for a first robot arm (for example, first robot arm 120 of robotic device system 800) and a second robot arm (for example, second robot arm 820 of robotic device system 800). It is pointed out that flowchart 900 correspondingly applies for more than two robot arms.

According to various specific embodiments, control model 200 may include a respective robot trajectory model 206 for first robot arm 120 and for second robot arm 820. Control model 200 may include a respective object pickup model 202 for first robot arm 120 and second robot arm 820. Control model 200 may include a respective precondition model 204 for first robot arm 120 and for second robot arm 820. Control model 200 may include a respective end condition model 208 for first robot arm 120 and for second robot arm 820.

According to various specific embodiments, computer 110 may be configured to ascertain in each case for first robot arm 120 and second robot arm 820 a plurality of pickup robot configurations 304 having associated probabilities of success, with the aid of particular object pickup model 202. For example, computer 110 may ascertain a first plurality of pickup robot configurations 304-1 with the aid of object pickup model 202-1 associated with first robot arm 120. For example, computer 110 may ascertain a second plurality of pickup robot configurations 304-2 with the aid of object pickup model 202-2 associated with second robot arm 820.

According to various specific embodiments, computer 110 may be configured to select the pickup robot configuration of the first plurality of pickup robot configurations 304-1 having the highest associated probability of success as the first pickup robot configuration, and to select the pickup robot configuration of the second plurality of pickup robot configurations 304-2 having the highest associated probability of success as the second pickup robot configuration. According to various specific embodiments, computer 110 may be configured to ascertain a first execution probability for the first pickup robot configuration with the aid of precondition model 204-1 associated with first robot arm 120, and to ascertain a second execution probability for the second pickup robot configuration with the aid of precondition model 204-2 associated with second robot arm 820. According to various specific embodiments, the pickup robot configuration of the first pickup robot configuration and of the second pickup robot configuration having the greater associated execution probability may be selected. As described, the first pickup robot configuration may be selected if the first execution probability is greater than the second execution probability, and the second pickup robot configuration may be selected if the second execution probability is greater than the first execution probability. According to various specific embodiments, the robot arm associated with the selected pickup robot configuration may be selected. Robot trajectory model 206 of the selected robot arm may ascertain a robot trajectory for the pickup for the selected pickup robot configuration.

According to various specific embodiments, computer 110 may be configured to ascertain one or multiple robot configurations of the first plurality of pickup robot configurations 304-1 with which a probability of success above a predefined first success threshold value (for example, greater than 70%, greater than 80%, greater than 90%, or greater than 95%, etc.) is associated. According to various specific embodiments, computer 110 may be configured to ascertain one or multiple robot configurations of the second plurality of pickup robot configurations 304-2 with which a probability of success above a predefined second success threshold value (for example, greater than 70%, greater than 80%, greater than 90%, or greater than 95%, etc.) is associated. In certain aspects the first success threshold value may correspond to the second success threshold value. According to various specific embodiments, the first success threshold value may be different from the second success threshold value (for example, as a function of the type of end effector). As described, different priorities may be associated with the robot arms with the aid of various success threshold values. For example, various geometric conditions of the robot arms may be taken into account in this way.

According to various specific embodiments, computer 110 may be configured to ascertain one or multiple first execution probabilities 308-1 (for example, one or multiple first confidences) associated with the one or multiple robot configurations selected from the first plurality of pickup robot configurations 304-1, using precondition model 204-1 associated with first robot arm 120. According to various specific embodiments, computer 110 may be configured to ascertain one or multiple second execution probabilities 308-2 (for example, one or multiple second confidences) associated with the one or multiple robot configurations selected from the second plurality of pickup robot configurations 304-2, using precondition model 204-2 associated with second robot arm 820.

According to various specific embodiments, computer 110 may be configured to select from the one or multiple robot configurations of first robot arm 120, selected from the first plurality of pickup robot configurations 304-1, and from the one or multiple robot configurations of second robot arm 820, selected from the second plurality of pickup robot configurations 304-2, pickup robot configuration 902 having the highest execution probability according to particular associated precondition model 204-1, 204-2. As described, a set made up of the one or multiple robot configurations of first robot arm 120 and the one or multiple robot configurations of second robot arm 820 may include a set of respective associated execution probabilities, and computer 110 may select pickup robot configuration 902 having the execution probability with the greatest associated value.

As described, selected pickup robot configuration 902 is associated with first robot arm 120 or second robot arm 820. A robot trajectory model 206-1 may be associated with first robot arm 120, and a robot trajectory model 206-2 may be associated with second robot arm 820.

According to various specific embodiments, robot trajectory 310 of the robot arm that is associated with selected pickup robot configuration 902 may be ascertained for selected pickup robot configuration 902 with the aid of robot trajectory model 206-1, 206-2 associated with the robot arm.

According to various specific embodiments, control device 106 may be configured to control 312 the robot arm of robotic device 101 associated with selected pickup robot configuration 902 for picking up the object with the aid of ascertained robot trajectory 310.

As described, for example a first pickup robot configuration of first robot arm 120 may have the highest probability of success, and a second pickup robot configuration of second robot arm 820 may have a lower probability of success; however, in this example the execution probability of the first pickup robot configuration, ascertained with the aid of precondition model 204-1 associated with first robot arm 120, may be lower than the execution probability of the second pickup robot configuration, ascertained with the aid of precondition model 204-2 associated with second robot arm 820. This may be the case, for example, if geometric conditions of first robot arm 120 for the first pickup robot configuration are not met, and/or if other objects limit (for example, block) a movement of first robot arm 120. As described, second robot arm 820 may be controlled in this way for picking up the object with the aid of the second pickup robot configuration.

According to various specific embodiments, control model 200 may include an end condition model in each case for first robot arm 120 and for second robot arm 820. According to various specific embodiments, control device 106 may be configured to control robotic device 101 (for example, first robot arm 120 or second robot arm 820) for carrying out the pickup of an object and a subsequent movement of the picked-up object. In this case, the selection as described with reference to FIG. 3A may take place in each case for first robot arm 120 and for second robot arm 820, pickup robot configuration 902 being selected from the set of execution probabilities of first robot arm 120 and of second robot arm 820, as described with reference to FIG. 9.

Figure 10:
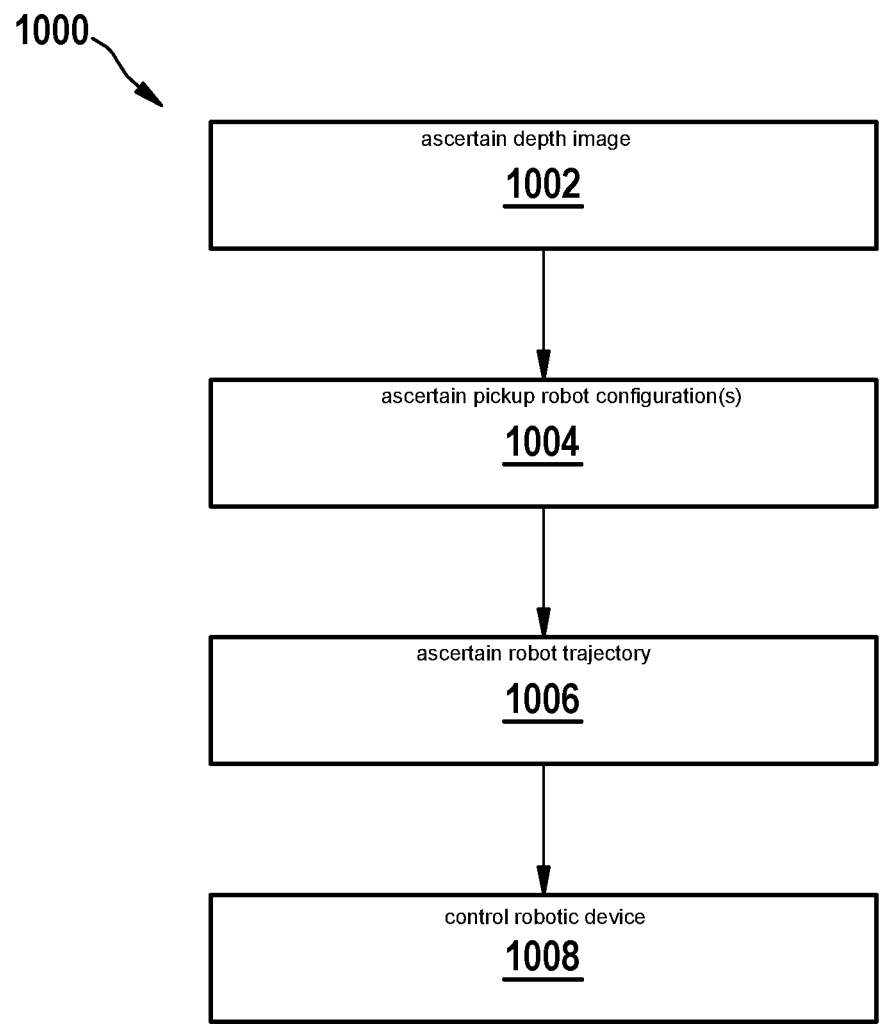
FIG. 10 shows a method for controlling a robotic device according to various specific embodiments of the present invention.

FIG. 10 shows a method 1000 for controlling a robotic device according to various specific embodiments.

According to various specific embodiments, the method may include the control of the robotic device using a control model. The control model may be configured to control the robotic device for picking up an object.

According to various specific embodiments, the control model may include a robot trajectory model, a precondition model, and an object pickup model. The robot trajectory model may include for the pickup a hidden semi-Markov model with one or multiple initial states and one or multiple end states. The precondition model may include for each initial state of the robot trajectory model a probability distribution of robot configurations before the pickup is carried out. The object pickup model may be configured to output a plurality of pickup robot configurations, having a respective associated probability of success, in response to an input of a depth image.

Method 1000 may include (in 1002) an ascertainment of a depth image showing one or multiple objects.

For at least one object to be moved of the one or multiple objects, method 1000 may include (in 1004) an ascertainment of one or multiple pickup robot configurations having a probability of success above a predefined threshold value with the aid of the object pickup model, using the depth image.

Method 1000 may include (in 1006) an ascertainment of a robot trajectory for the pickup with the aid of the robot trajectory model for the pickup robot configuration having the highest associated probability (for example, confidence) according to the precondition model.

Method 1000 may include (in 1008) a control of the robotic device for carrying out the pickup of the object (associated with the pickup robot configuration having the highest associated probability) with the aid of the ascertained robot trajectory.

According to various specific embodiments, the robotic device may include a first robot arm for picking up an object and a second robot arm for picking up an object. The control model may include a robot trajectory model, a precondition model, and an object pickup model in each case for the first robot arm and for the second robot arm. In this example, the ascertainment of the one or multiple pickup robot configurations having a probability of success above the predefined threshold value with the aid of the object pickup model, using the depth image (in 1004) for the at least one object to be moved of the one or multiple objects, may include an ascertainment of one or multiple pickup robot configurations of the first robot arm having a probability of success above a predefined threshold value (a first predefined threshold value, for example) with the aid of the object pickup model associated with the first robot arm, using the depth image, and an ascertainment of one or multiple pickup robot configurations of the second robot arm having a probability of success above a predefined threshold value (a second predefined threshold value, for example) with the aid of the object pickup model associated with the second robot arm, using the depth image. The ascertainment of the robot trajectory for the pickup with the aid of the robot trajectory model for the pickup robot configuration having the highest associated probability (for example, confidence) according to the precondition model (in 1006) may include: selecting the pickup robot configuration from the one or multiple pickup robot configurations of the first robot arm and the one or multiple pickup robot configurations of the second robot arm having the highest probability (for example, confidence) according to the precondition model, selecting the robot arm associated with the selected pickup robot configuration, and ascertaining a robot trajectory for the pickup according to the selected pickup robot configuration with the aid of the robot trajectory model associated with the selected robot arm. The control of the robotic device for carrying out the pickup of the object with the aid of the ascertained robot trajectory (in 1008) may include a control of the selected robot arm of the robotic device for carrying out the pickup of the object (associated with the selected pickup robot configuration) with the aid of the ascertained robot trajectory.

What is claimed is:

1. A method for controlling a robotic device, including a control model that is configured to control the robotic device for picking up an object, the control model including a robot trajectory model, a precondition model, and an object pickup model, the robot trajectory model for the pickup including a hidden semi-Markov model with one or multiple initial states and one or multiple end states, the precondition model including, for each initial state of the robot trajectory model, a probability distribution of robot configurations before the pickup is carried out, the object pickup model, in response to an input of a depth image, outputting a plurality of pickup robot configurations having a respective associated probability of success, the method comprising the following steps:

ascertaining a depth image that shows one or multiple objects;

for at least one object to be moved of the one or multiple objects, ascertaining one or multiple pickup robot configurations having a probability of success above a predefined threshold value with the aid of the object pickup model, using the depth image;

ascertaining, for the pickup robot configuration of the one or multiple pickup robot configurations having a highest probability according to the precondition model, a robot trajectory for the pickup with the aid of the robot trajectory model; and controlling the robotic device for carrying out the pickup of the object using the ascertained robot trajectory.

2. The method as recited in claim 1, wherein the robot trajectory model and the precondition model are trained using demonstrations for carrying out a pickup of an object.

3. The method as recited in claim 1, wherein the object pickup model is trained using a plurality of training depth images, each training depth image of the training depth images showing at least one object of a plurality of objects, the training including:

for each training depth image of the plurality of training depth images, simulating a repeated pickup of the at least one object, and ascertaining, as a reward, whether or not each pickup of the at least one object is successful, each pickup of the at least one object being associated with a respective pickup robot configuration;

training the object pickup model using the plurality of training depth images, the rewards, and the pickup robot configurations, in such a way that the trained object pickup model, in response to an input of a depth image, outputs a plurality of pickup robot configurations having a respective associated probability of success.

4. The method as recited in claim 3, wherein each pickup of an object is simulated using the robot trajectory model and the precondition model.

5. The method as recited in claim 3, further comprising:
ascertaining whether or not a carrying out of the pickup of the object by the robotic device is successful, a predefined maximum reward being ascertained when the carrying out of the pickup is successful, and a predefined minimum reward being ascertained when the carrying out of the pickup is not successful;

additionally training the object pickup model using the ascertained depth image, the pickup robot configuration for which the robot trajectory is ascertained, and the ascertained reward.

6. The method as recited in claim 1, wherein the control model is also configured to control the robotic device for moving a picked-up object, the robot trajectory model including for the movement a hidden semi-Markov model with one or multiple initial states and one or multiple end states, the precondition model including, for each initial state of the robot trajectory model associated with the movement, a probability distribution of robot configurations before the movement is carried out, and the control model also including an end condition model, the end condition model, for each end state of the robot trajectory model associated with the pickup, including a probability distribution of robot configurations after carrying out the pickup, and including, for each end state of the robot trajectory model associated with the movement, a probability distribution of robot configurations after the movement is carried out, and wherein the method further comprises:

ascertaining a robot configuration after carrying out the pickup of the object according to the end condition model;

ascertaining a robot trajectory for moving the object with the aid of the robot trajectory model; and controlling the robotic device for carrying out the movement of the object with the aid of the ascertained robot trajectory for moving the object.

7. The method as recited in claim 6, wherein the robot trajectory model, the precondition model, and the end condition model are trained using demonstrations for carrying out the pickup of an object and demonstrations for carrying out a movement of an object.

8. The method as recited in claim 6, wherein the object pickup model is trained using a plurality of training depth images, each training depth image showing at least one object of a plurality of objects, the training including:

for each training depth image of the plurality of training depth images, simulating a repeated pickup and subsequent movement of the at least one object and ascertaining, as a reward, whether or not the particular pickup and subsequent movement of the at least one object is successful, each pickup of the at least one object being associated with a respective pickup robot configuration;

training the object pickup model, using the plurality of training depth images, the rewards, and the pickup robot configurations, in such a way that the trained object pickup model, in response to an input of a depth image, outputs a plurality of pickup robot configurations having a respective associated probability of success.

9. The method as recited in claim 8, wherein each pickup and subsequent movement of an object is simulated using the robot trajectory model, the precondition model, and the end condition model.

10. The method as recited in claim 6, further comprising:
ascertaining whether or not the carrying out of the movement of the object by the robotic device is successful, a predefined maximum reward being ascertained when the carrying out of the movement is successful, and a predefined minimum reward being ascertained when the carrying out of the movement is not successful; and additionally training the object pickup model using the ascertained depth image, the pickup robot configuration for which the robot trajectory for picking up the object is ascertained, and the ascertained reward.

11. The method as recited in claim 1, wherein:
the robotic device includes a first robot arm for picking up an object and a second robot arm for picking up an object, the control model including a respective robot trajectory model, a respective precondition model, and a respective object pickup model for each of the first robot arm and the second robot arm, and wherein the ascertainment of one or multiple pickup robot configurations having a probability of success above a predefined threshold value with the aid of the object pickup model for at least one object to be moved of the one or multiple objects, using the depth image, includes:

for at least one object to be moved of the one or multiple objects, ascertaining one or multiple pickup robot configurations of the first robot arm having a probability of success above a predefined threshold value with the aid of the respective object pickup model associated with the first robot arm, using the depth image, and ascertaining one or multiple pickup robot configurations of the second robot arm having a probability of success above a predefined threshold value with the aid of the respective object pickup model associated with the second robot arm, using the depth image;

the ascertainment of the robot trajectory for the pickup with the aid of the robot trajectory model for the pickup robot configuration of the one or multiple pickup robot configurations having the highest probability according to the precondition model including:
  selecting the pickup robot configuration from the one or multiple pickup robot configurations of the first robot arm and the one or multiple pickup robot configurations of the second robot arm having the highest probability, according to the respective associated precondition model, and selecting a robot arm associated with the selected pickup robot configuration, and ascertaining a robot trajectory for the pickup according to the selected pickup robot configuration with the aid of the robot trajectory model associated with the selected robot arm; and
the control of the robotic device for carrying out the pickup of the object with the aid of the ascertained robot trajectory includes:
  controlling the selected robot arm of the robotic device for carrying out the pickup of the object with the aid of the ascertained robot trajectory.

12. The method as recited in claim 11, wherein the pickup of an object with the aid of the first robot arm includes suctioning the object, and/or the pickup of an object with the aid of the second robot arm includes gripping the object.

13. A device configured to control a robotic device, including a control model that is configured to control the robotic device for picking up an object, the control model including a robot trajectory model, a precondition model, and an object pickup model, the robot trajectory model for the pickup including a hidden semi-Markov model with one or multiple initial states and one or multiple end states, the precondition model including, for each initial state of the robot trajectory model, a probability distribution of robot configurations before the pickup is carried out, the object pickup model, in response to an input of a depth image, outputting a plurality of pickup robot configurations having a respective associated probability of success, the device configured to:
  ascertain a depth image that shows one or multiple objects;
  for at least one object to be moved of the one or multiple objects, ascertain one or multiple pickup robot configurations having a probability of success above a predefined threshold value with the aid of the object pickup model, using the depth image;
  ascertain, for the pickup robot configuration of the one or multiple pickup robot configurations having a highest probability according to the precondition model, a robot trajectory for the pickup with the aid of the robot trajectory model; and
  control the robotic device for carrying out the pickup of the object using the ascertained robot trajectory.

14. A non-transitory computer-readable medium on which is stored instructions for controlling a robotic device, including a control model that is configured to control the robotic device for picking up an object, the control model including a robot trajectory model, a precondition model, and an object pickup model, the robot trajectory model for the pickup including a hidden semi-Markov model with one or multiple initial states and one or multiple end states, the precondition model including, for each initial state of the robot trajectory model, a probability distribution of robot configurations before the pickup is carried out, the object pickup model, in response to an input of a depth image, outputting a plurality of pickup robot configurations having a respective associated probability of success, the instructions, when executed by a processor, causing the processor to perform the following steps:
  ascertaining a depth image that shows one or multiple objects;
  for at least one object to be moved of the one or multiple objects, ascertaining one or multiple pickup robot configurations having a probability of success above a predefined threshold value with the aid of the object pickup model, using the depth image;
  ascertaining, for the pickup robot configuration of the one or multiple pickup robot configurations having a highest probability according to the precondition model, a robot trajectory for the pickup with the aid of the robot trajectory model; and
  controlling the robotic device for carrying out the pickup of the object using the ascertained robot trajectory.

\* \* \* \* \*